(12) United States Patent
Yokota et al.

(10) Patent No.: US 12,440,785 B2
(45) Date of Patent: Oct. 14, 2025

(54) FILTRATION FILTER AND FILTRATION DEVICE

(71) Applicant: Murata Manufacturing Co., Ltd., Nagaokakyo (JP)

(72) Inventors: Shusuke Yokota, Nagaokakyo (JP); Masaru Banju, Nagaokakyo (JP); Toshikazu Kawaguchi, Nagaokakyo (JP); Takashi Kondo, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 290 days.

(21) Appl. No.: 16/933,321

(22) Filed: Jul. 20, 2020

(65) Prior Publication Data
US 2020/0346144 A1 Nov. 5, 2020

Related U.S. Application Data

(63) Continuation of application No. PCT/JP2019/001076, filed on Jan. 16, 2019.

(30) Foreign Application Priority Data

Mar. 19, 2018 (JP) .................... 2018-051472

(51) Int. Cl.
*B01D 35/30* (2006.01)
*B01D 29/00* (2006.01)
(Continued)

(52) U.S. Cl.
CPC ............ *B01D 35/30* (2013.01); *B01D 29/00* (2013.01); *B01D 29/0097* (2013.01);
(Continued)

(58) Field of Classification Search
CPC ...... B01D 35/30; B01D 29/00; B01D 63/087; B01D 69/02; B01D 39/20;
(Continued)

(56) References Cited

U.S. PATENT DOCUMENTS 2,547,797 A * 4/1951 Torrey ................... B01D 29/00
                                                      248/247
4,157,967 A * 6/1979 Meyst ................. B29C 66/1312
                                                      D23/209
(Continued)

FOREIGN PATENT DOCUMENTS

CN        102292115 A     12/2011
CN        102814065 A     12/2012
(Continued)

OTHER PUBLICATIONS

"Film." Merriam-Webster.com Dictionary, Merriam-Webster, https://www.merriam-webster.com/dictionary/film. Accessed Jan. 13, 2023. (Year: 2023).*
(Continued)

*Primary Examiner* — Magali P Slawski
*Assistant Examiner* — Bernadette Karen McGann
(74) *Attorney, Agent, or Firm* — ArentFox Schiff LLP

(57) ABSTRACT

A filtration filter that includes a filter section having a plurality of through-holes passing through a first main surface and constructed such that objects to be filtered contained in a liquid are captured and a second main surface opposite the first main surface; and a frame section surrounding an outer periphery of the filter section, wherein a first film thickness at a center of the filter section is larger than a second film thickness of the filter section at a position closer to the frame section than the center of the filter section.

19 Claims, 16 Drawing Sheets

(51) Int. Cl.
 *B01D 29/01* (2006.01)
 *B01D 29/05* (2006.01)
 *B01D 39/20* (2006.01)
 *B01D 63/08* (2006.01)
 *B01D 69/02* (2006.01)
 *C12M 1/28* (2006.01)

(52) U.S. Cl.
 CPC .......... *B01D 29/014* (2013.01); *B01D 29/05* (2013.01); *B01D 63/087* (2013.01); *B01D 69/02* (2013.01); *B01D 29/0095* (2013.01); *B01D 29/01* (2013.01); *B01D 39/20* (2013.01); *B01D 2201/184* (2013.01); *B01D 2239/0478* (2013.01); *B01D 2275/202* (2013.01); *C12M 1/28* (2013.01)

(58) Field of Classification Search
 CPC .......... B01D 2201/184; B01D 39/2068; B01D 2239/0414; B01D 2239/0478; B01D 29/05; B01D 29/0097; B01D 29/014; B01D 29/0004; B01D 29/0095; B01D 29/01; B01D 2275/202; B01D 46/4227; B01D 2201/24; B01D 33/803; B01D 2201/18; B01D 2201/04; B01D 2201/0415; B01D 2201/30; B01D 2313/20; B01D 2313/201; B01D 2313/2031; B01D 2239/12; B01D 2239/1208; B01D 2239/1216; B01D 2239/1291; B01D 2275/20; B01D 2275/205; B01D 2275/206; C12M 1/28; A61M 5/165
 See application file for complete search history.

(56) References Cited

U.S. PATENT DOCUMENTS

| | | | |
|---|---|---|---|
| 5,423,893 | A | 6/1995 | Kotaki |
| 5,587,077 | A | 12/1996 | Aaltonen et al. |
| 5,650,181 | A | 7/1997 | Kotaki |
| 2004/0040271 | A1* | 3/2004 | Kopec ............ B01D 46/0004 55/482 |
| 2006/0252044 | A1 | 11/2006 | Okumura et al. |
| 2012/0024779 | A1 | 2/2012 | Ochiai et al. |
| 2012/0305500 | A1* | 12/2012 | Bormann ........ B01L 3/502753 210/416.1 |
| 2013/0264272 | A1 | 10/2013 | Jeon et al. |
| 2014/0223873 | A1* | 8/2014 | Ebrahimi Warkiani ............ B01D 39/083 210/488 |
| 2017/0059460 | A1* | 3/2017 | Jeon ............... A61M 1/341 |
| 2017/0196542 | A1 | 7/2017 | Spiteri et al. |
| 2017/0203260 | A1 | 7/2017 | Kondo et al. |
| 2017/0212022 | A1 | 7/2017 | Kawara et al. |
| 2018/0021709 | A1 | 1/2018 | Yamamoto et al. |

FOREIGN PATENT DOCUMENTS

| | | | |
|---|---|---|---|
| CN | 103270150 | A | 8/2013 |
| CN | 203400617 | U | 1/2014 |
| CN | 204153879 | U | 2/2015 |
| CN | 111801150 | B | 5/2023 |
| JP | H0687174 | A | 3/1994 |
| JP | H07502308 | A | 3/1995 |
| JP | H07204423 | A | 8/1995 |
| JP | 2005148048 | A | 6/2005 |
| JP | 2009284860 | A | 12/2009 |
| JP | 2013541958 | A1 | 11/2013 |
| JP | 2017144434 | A | 8/2017 |
| WO | 2015087370 | A1 | 6/2015 |
| WO | 2016117486 | A1 | 7/2016 |
| WO | 2016117541 | A1 | 7/2016 |
| WO | 2017141609 | A1 | 8/2017 |

OTHER PUBLICATIONS

"Convex." Merriam-Webster.com Dictionary, Merriam-Webster, https://www.merriam-webster.com/dictionary/convex. Accessed Jan. 13, 2023. (Year: 2023).*
"Concave." Merriam-Webster.com Dictionary, Merriam-Webster, https://www.merriam-webster.com/dictionary/concave. Accessed Jan. 13, 2023. (Year: 2023).*
Chinese Office Action issued for CN Application No. 201980014685.6, issuing date of Office Action is Dec. 29, 2021.
Chinese Office Action issued for CN Application No. 201980014685.6, issuing date Jul. 5, 2021.
International Search Report issued for PCT/JP2019/001076, date of mailing Apr. 11, 2019.
Written Opinion of the International Searching Authority issued for PCT/JP2019/001076, date of mailing Apr. 11, 2019.

* cited by examiner

| THICKNESS H OF CENTRAL PORTION [μm] | POSITION OF MAXIMUM STRESS |
|---|---|
| 5 | CENTRAL PORTION |
| 6 | CENTRAL PORTION |
| 7 | CENTRAL PORTION |
| 8 | CENTRAL PORTION |
| 9 | CENTRAL PORTION |
| 10 | CENTRAL PORTION |
| 11 | END PORTION |
| 12 | END PORTION |
| 13 | END PORTION |
| 14 | END PORTION |
| 15 | END PORTION |
| 16 | END PORTION |
| 17 | END PORTION |
| 18 | END PORTION |
| 19 | END PORTION |
| 20 | CENTRAL PORTION |

FILTRATION FILTER AND FILTRATION DEVICE

CROSS REFERENCE TO RELATED APPLICATIONS

The present application is a continuation of International application No. PCT/JP2019/001076, filed Jan. 16, 2019, which claims priority to Japanese Patent Application No. 2018-051472, filed Mar. 19, 2018, the entire contents of each of which are incorporated herein by reference.

FIELD OF THE INVENTION

The present invention relates to a filtration filter and a filtration device.

BACKGROUND OF THE INVENTION

As a filtration filter, for example, a filter described in Patent Document 1 captures nucleated cells and platelets from a liquid containing red blood cells, nucleated cells, and platelets.
Patent Document 1: Japanese Unexamined Patent Application Publication No. 2009-284860

SUMMARY OF THE INVENTION

However, in the filter disclosed in Patent Document 1, there is still room for improvement in terms of improvement in durability.

An object of the present invention is to provide a filtration filter and a filtration device capable of improving durability.

A filtration filter of one aspect of the present invention includes: a filter section having a plurality of through-holes passing through a first main surface and constructed such that objects to be filtered contained in a liquid are captured and a second main surface opposite the first main surface; and a frame section surrounding an outer periphery of the filter section, wherein a first film thickness at a center of the filter section is larger than a second film thickness of the filter section at a position closer to the frame section than the center of the filter section.

A filtration device of one aspect of the present invention includes: the aforementioned filtration filter; and a housing defining a flow path through for the liquid and holding the filtration filter in the flow path. The housing includes: a first housing section defining a first flow path facing the first main surface of the filter section of the filtration filter, and a second housing section defining a second flow path facing the second main surface of the filter section of the filtration filter, and the first housing section is configured to fit with the second housing section with the frame section of the filtration filter interposed therebetween such that the frame section is sandwiched in a thickness direction and held by the first housing section and the second housing section in a state where the filtration filter continuously extends in a direction from the filter section toward the frame section.

According to the present invention, it is possible to provide a filtration filter and a filtration device capable of improving durability.

DETAILED DESCRIPTION OF THE PREFERRED EMBODIMENTS

Figure 1:
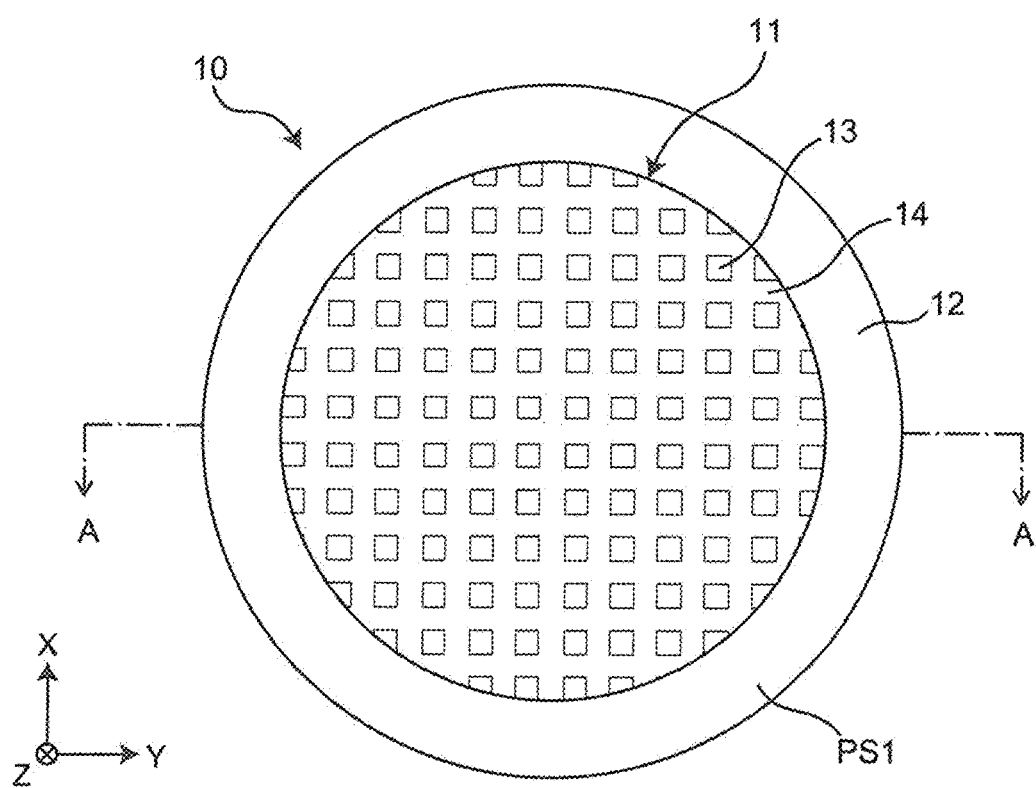
FIG. 1 is a schematic configuration diagram of an example of a filtration filter of Embodiment 1 according to the present invention.

When objects to be filtered contained in a liquid are filtered using a filtration filter, the liquid may not pass through the filtration filter, and filtration efficiency may decrease in some cases. One method for solving the decrease in the filtration efficiency is to perform filtration using a pipette.

In this method, the liquid is discharged from a tip of the pipette to the filtration filter while the tip of the pipette containing the liquid containing the objects to be filtered is pressed against the filter.

In this method, the present inventors have newly found a problem that when the filtration filter is pushed by the tip of the pipette, stress concentrates on a portion in contact with the tip of the pipette, and the filtration filter may be broken.

Accordingly, the present inventors have conducted earnest studies and found that durability can be improved by forming a filter section of a filtration filter in a convex shape, and arrived at the present invention.

A filtration filter of one aspect of the present invention includes: a filter section having a plurality of through-holes passing through a first main surface and constructed such that objects to be filtered contained in a liquid are captured and a second main surface opposite the first main surface; and a frame section surrounding an outer periphery of the filter section, wherein a first film thickness at a center of the filter section is larger than a second film thickness of the filter section at a position closer to the frame section than the center of the filter section.

With such a configuration, durability can be improved.

In the filtration filter, the second main surface of the filter section may have a flat shape.

With such a configuration, the liquid is easily discharged from the plurality of through-holes of the filter section, and the filtration time can be shortened.

In the filtration filter, the first film thickness at the center of the filter section may be larger than a thickness of the frame section.

With such a configuration, durability can be further improved.

In the filtration filter, the second film thickness of the filter section at the position closer to the frame section than the center of the filter section may be larger than the thickness of the frame section.

With such a configuration, durability can be further improved.

In the filtration filter, the first film thickness at the center of the filter section may be 1.1 times to 1.9 times the second film thickness of the filter section at the position closer to the frame section than the center of the filter section.

With such a configuration, durability can be further improved.

In the filtration filter, the filter section may have a substantially circular shape and the frame section may have a ring shape surrounding the outer periphery of the filter section.

With such a configuration, durability can be further improved.

A filtration device of another aspect of the present invention includes the aforementioned filtration filter; and a housing defining a flow path for the liquid and holding the filtration filter in the flow path. The housing includes: a first housing section defining a first flow path facing the first main surface of the filter section of the filtration filter, and a second housing section defining a second flow path facing the second main surface of the filter section of the filtration filter, the first housing section is configured to fit with the second housing section with the frame section of the filtration filter interposed therebetween such that the frame section is sandwiched in a thickness direction and held by the first housing section and the second housing section in a state where the filtration filter continuously extends in a direction from the filter section toward the frame section.

With such a configuration, durability can be improved.

In the filtration device, the first housing section may have a convex stepped portion that protrudes in a direction from the first housing section toward the second housing section on a side thereof fitted with the second housing section, the second housing section may have a concave stepped portion that is recessed in the direction from the first housing section toward the second housing section on a side thereof fitted with the first housing section, and the convex stepped portion fits to the concave stepped portion such that the frame section of the filtration filter is sandwiched therebetween in the thickness direction.

With such a configuration, durability can be further improved.

In the filtration device, the second housing section may have a flange portion extending outward from a side wall of the second housing section.

With such a configuration, usability of the filtration device is improved.

In the filtration device, the first housing section may have a flange portion extending outward from a side wall of the first housing section.

With such a configuration, the usability of the filtration device is improved.

In the filtration device, the second housing section may have a handle.

With such a configuration, the usability of the filtration device is improved.

A filtration filter of yet another aspect of the present invention includes: a filter section having a plurality of through-holes passing through a first main surface and constructed such that objects to be filtered contained in a liquid are captured and a second main surface opposite the first main surface, and a frame section surrounding an outer periphery of the filter section, wherein the filter section has a convex shape protruding out from a side of the first main surface.

With such a configuration, durability can be improved.

In the filtration filter, the second main surface of the filter section may have a flat shape.

With such a configuration, the liquid is easily discharged from the plurality of through-holes of the filter section, and the filtration time can be shortened.

A filtration device of a further aspect of the present invention includes: the filtration filter of the yet another aspect of the present invention; and a housing defining a flow path for the liquid and holding the filtration filter in the flow path. The housing includes: a first housing section defining a first flow path facing the first main surface of the filter section of the filtration filter, and a second housing section defining a second flow path facing the second main surface of the filter section of the filtration filter, and the first housing section is configured to fit with the second housing section with the frame section of the filtration filter interposed therebetween such that the frame section is sandwiched in a thickness direction and held by the first housing section and the second housing section in a state where the filtration filter continuously extends in a direction from the filter section toward the frame section.

With such a configuration, durability can be improved.

Hereinafter, Embodiment 1 according to the present invention will be described with reference to the accompanying drawings. In addition, in each of the drawings, for ease of description, each element is exaggeratedly illustrated in order to facilitate the description.

Embodiment 1

[Overall Configuration]

Figure 2:
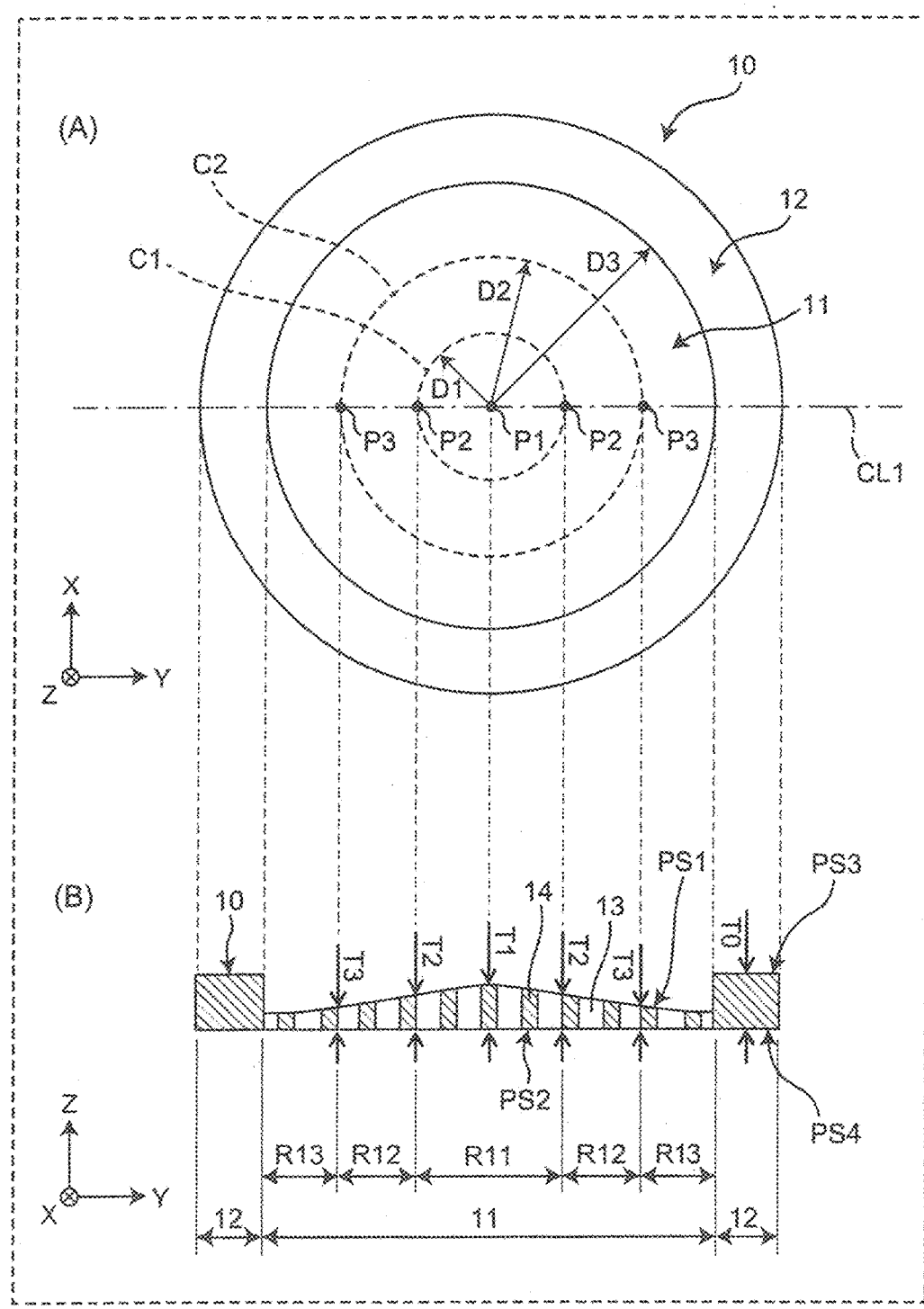
FIG. 2 includes a schematic plan view and a schematic cross-sectional view illustrating a structure of the filtration filter in FIG. 1.

FIG. 1 is a schematic configuration diagram of an example of a filtration filter 10 of Embodiment 1 according to the present invention. FIG. 2 includes a schematic plan view and a schematic sectional view illustrating a structure of the filtration filter in FIG. 1. FIG. 2, Part (A), is the schematic plan view of the filtration filter 10, and FIG. 2, Part (B), is the schematic sectional view of the filtration filter 10 in FIG. 1 taken along a line A-A. In the drawings, X, Y, and Z directions indicate a lateral direction, a longitudinal direction, and a thickness direction of the filtration filter 10, respectively.

[Overall Configuration]

As illustrated in FIGS. 1 and 2, the filtration filter 10 includes a filter section 11 and a frame section 12 disposed to surround an outer periphery of the filter section 11. In Embodiment 1, the filtration filter 10 is a metal filter.

<Filter Section>

The filter section 11 is a plate-shaped structure having a first main surface PS1 in which objects to be filtered contained in a liquid are captured, and a second main surface PS2 opposite the first main surface PS1. The filter section 11 is formed with a plurality of through-holes 13 passing through the first main surface PS1 and the second main surface PS2. Specifically, the plurality of through-holes 13 are formed in a filter base section 14 that constitutes the filter section 11.

The filter section 11 has a convex shape protruding out from the first main surface PS1 side. The filter section 11 does not have a uniform film thickness, but is formed such that a film thickness on a central side is larger than a film thickness on a rim side. In other words, the filter section 11 is formed such that the film thickness decreases from the center toward the rim side (i.e., from the center outwards).

A more specific structure of the filtration filter 10 will be described with reference to FIG. 2. As illustrated in FIG. 2, Part (A), the entire filter section 11 is a circular region having a radius D3 with P1 as a center. In the filter section 11, virtual circles C1 and C2 having a radius D1 smaller than the radius D3 and a radius D2 smaller than the radius D3 and larger than the radius D1 are drawn around the center P1. Here, the radius D1 is the radius D3×⅓, and the radius D2 is the radius D3×⅔. In the filter section 11, a circular region surrounded by the virtual circle C1 is defined as a central side region R11, an annular region sandwiched between the virtual circle C1 and the virtual circle C2 is defined as an intermediate region R12, and an annular region between the virtual circle C2 and an outer peripheral side of the filter section 11 is defined as a rim side region R13. Further, when a virtual straight line CL1 passing through the center P1 of the filter section 11 is drawn in a plan view of the filter section 11, intersection points (first positions) of the virtual straight line CL1 and the virtual circle C1 are defined as P2, and intersection points (second positions) of the virtual straight line CL1 and virtual circle C2 are defined as P3.

Next, the film thickness of the filter section 11 will be described. The film thickness of the filter section can be measured by using SEM. For example, at a time of measurement, an acceleration voltage is set to 1 kV, and a magnification is set to 1000 times. A sample stage on which the filtration filter is placed is tilted by 40°, and a width of a grid side surface of the filter section 11, that is, a width of the grid that extends in a direction perpendicular to an upper surface of the filtration filter 10, is measured. Boundaries at both ends of the grid are determined by transition of an amount of light on an image during SEM measurement. The amount of generated secondary electrons changes inside and outside the grid. The change points are defined as boundaries, the width of the grid is measured, and the measured width is set as the film thickness of the filter section.

As illustrated in FIG. 2, Part (B), in the filter section 11, a film thickness T1 of the filter section 11 in the central side region R11 further away from the frame section 12 than the rim side region R13 is larger than a film thickness T3 of the filter section in the rim side region R13 closer to the frame section 12 than the central side region R11. Further, in the filter section 11, a film thickness T2 in the intermediate region R12 located between the central side region R11 and the rim side region R13 is smaller than the film thickness T1 of the central side region R11 and is larger than the film thickness T3 of the rim side region R13.

Specifically, when the film thickness at the center P1 of the filter section 11 is defined as T1, the film thickness at the intersection point P2 is defined as T2, and the film thickness at the intersection point P3 is defined as T3, the film thicknesses satisfy a relationship of T1>T2>T3. In this way, in the filter section 11, the film thickness is set such that the film thickness increases from the rim side toward the central side of the filter section 11. In other words, in the filter section 11, the film thickness is set such that the film thickness decreases from the center P1 of the filter section 11 toward a radial direction (outward in the radial direction). Further, the film thickness may linearly decrease from the center P1 to the intersection point T3.

For example, the film thickness T1 at the center P1 of the filter section 11 is 1.1 times to 1.9 times the film thickness T3 of the filter section 11 at the position closer to the frame section 12 than the center P1 of the filter section 11.

In Embodiment 1, the film thickness of the filter section 11 continuously changes. Specifically, the first main surface PS1 of the filter section 11 is inclined toward the second main surface PS2 side from the center P1 of the filter section 11 toward the frame section 12, so that the film thickness of the filter section 11 decreases from the center P1 of the filter section 11 toward the frame section 12. Further, each of the film thicknesses T1, T2, and T3 of the filter section 11 is smaller than a thickness T0 of the frame section 12.

In addition, the second main surface PS2 of the filter section 11 preferably has a flat shape. In the present specification, the "flat shape" means a shape in which the entire surface of the second main surface PS2 is in contact with a horizontal surface when the second main surface PS2 side is placed on the horizontal surface.

Referring back to FIG. 1, a shape of the filter section 11 is, for example, a circular shape, a rectangular shape, or an elliptical shape as viewed from the thickness direction (Z direction) of the filtration filter 10. In Embodiment 1, the filter section 11 has a substantially circular shape. Note that, in the present specification, the "substantially circular shape" means that a ratio of a length of the major axis to a length of the minor axis is 1.0 to 1.2.

In the present specification, the "objects to be filtered" means objects to be filtered out of objects contained in the liquid. For example, the objects to be filtered may be biological substances contained in the liquid. The "biological substance" means a substance derived from organisms, such as cells (eukaryotes), bacteria (eubacteria), viruses, and the like. Examples of cells (eukaryotes) include, for example, induced pluripotent stem cells (iPS cells), ES cells, stem cells, mesenchymal stem cells, mononuclear cells, unicellular cells, cell clusters, floating cells, adherent cells, nerve cells, white blood cells, regenerative medical cells, autologous cells, cancer cells, blood circulating tumor cells (CTC), HL-60, HELA, and fungi. Examples of bacteria (eubacteria) include, for example, *Escherichia coli* and *Mycobacterium tuberculosis*.

In Embodiment 1, as one example, the liquid is a cell suspension, and the objects to be filtered are cells.

Figure 3:
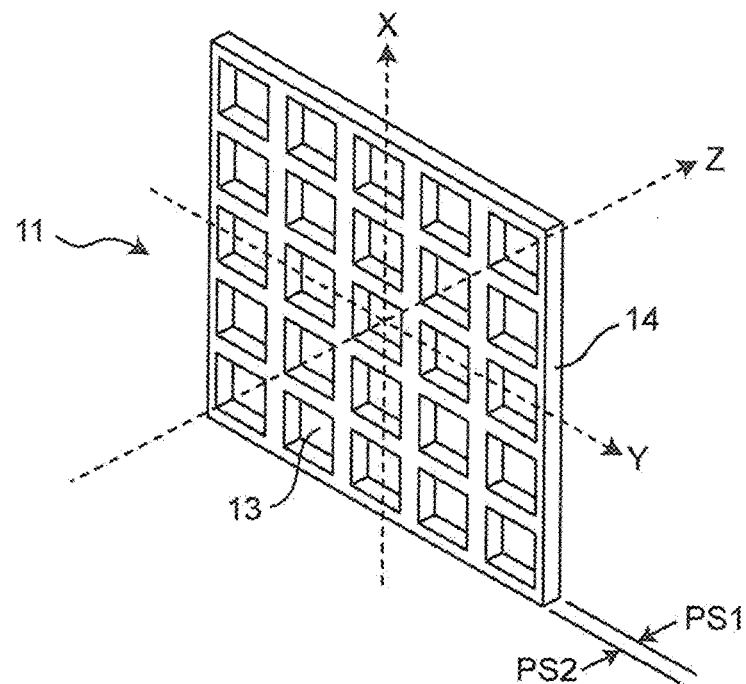
FIG. 3 is an enlarged perspective view of a portion of an exemplary filter section.
Figure 4:
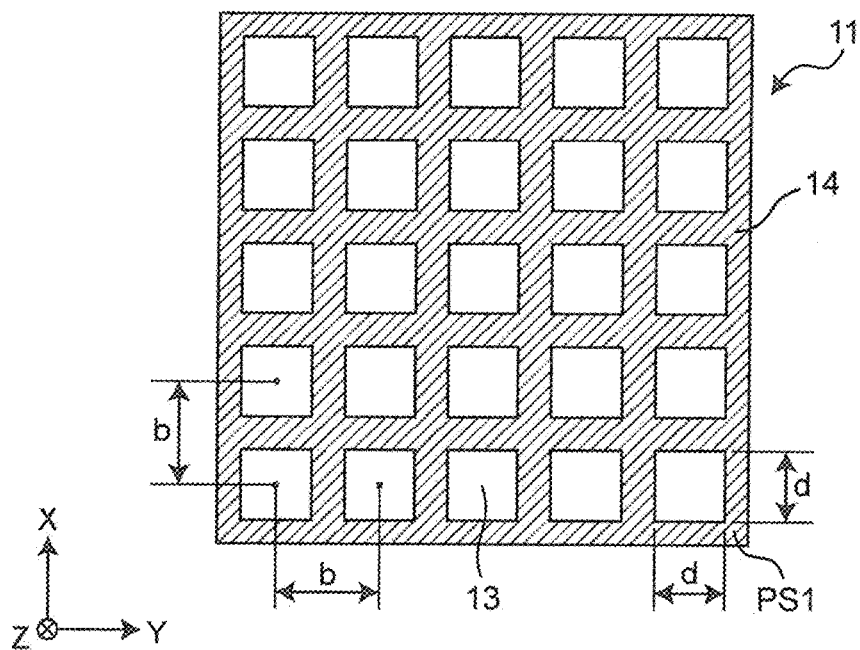
FIG. 4 is a schematic view of the portion of the filter section in FIG. 3 as viewed from a thickness direction.

FIG. 3 is an enlarged perspective view of a portion of the exemplary filter section 11. FIG. 4 is a schematic view of the portion of the filter section 11 in FIG. 3 as viewed from the thickness direction.

As illustrated in FIGS. 3 and 4, the plurality of through-holes 13 are periodically arranged on the first main surface PS1 and the second main surface PS2 of the filter section 11. Specifically, the plurality of through-holes 13 are arranged in a matrix at equal intervals in the filter section 11.

In Embodiment 1, the through-hole 13 has a square shape when viewed from the first main surface PS1 side of the filter section 11, that is, the Z direction. Note that the shape of the through-hole 13 is not limited to the square shape as viewed from the Z direction, and may be, for example, a polygonal shape such as a rectangular shape and a hexagonal shape, a circular shape, an elliptical shape, or the like.

In Embodiment 1, a shape of the through-hole 13 projected on a surface perpendicular to the first main surface PS1 of the filter section 11 (sectional shape) is a rectangular shape. Specifically, the sectional shape of the through-hole 13 is the rectangular shape in which a length of one side in the radial direction of the filtration filter 10 is longer than a length of one side in the thickness direction of the filtration filter 10. The sectional shape of the through-hole 13 is not limited to the rectangular shape, and may be, for example, a tapered shape such as a parallelogram, a trapezoid, and the like, a symmetrical shape, or an asymmetric shape.

In Embodiment 1, when viewed from the first main surface PS1 side (Z direction) of the filter section 11, the plurality of through-holes 13 are arranged at equal intervals in two arrangement directions parallel to the respective sides of a square, that is, in the X direction and the Y direction in FIG. 4. As described above, by arranging the plurality of through-holes 13 in the square grid arrangement, an aperture ratio can be increased, and a passage resistance of the liquid to the filtration filter 10 can be reduced. With such a configuration, the filtration time can be shortened and the stress on the objects to be filtered can be reduced.

The arrangement of the plurality of through-holes 13 is not limited to the square grid arrangement, and may be, for example, a quasi-periodic arrangement or a periodic arrangement. As an example of the periodic arrangement, as long as it is a square arrangement, it may be a rectangular arrangement in which intervals in the two arrangement directions are not equal, or a triangular grid arrangement or a regular triangular grid arrangement. The plurality of through-holes 13 may be provided in the filter section 11, and the arrangement thereof is not limited.

An interval b between the plurality of through-holes 13 is appropriately designed according to a type (size, shape, property, elasticity) or an amount of cells to be isolated. Here, as illustrated in FIG. 4, the interval b between the through-holes 13 means a distance between a center of any through-hole 13 and a center of an adjacent through-hole 13 when the through-hole 13 is viewed from the first main surface PS1 side of the filter section 11. In a case of a structure of the periodic arrangement, the interval b between the through-holes 13 is, for example, larger than 1 time and less than or equal to 10 times one side d of the through-hole 13, and is preferably less than or equal to 3 times the one side d of the through-hole 13. Alternatively, for example, an aperture ratio of the filter section 11 is 10% or more, and preferably the aperture ratio is 25% or more and 75% or less. With such a configuration, the passage resistance of the liquid to the filter section 11 can be reduced. Therefore, a processing time can be shortened, and a stress on the cells can be reduced. The aperture ratio is calculated by (area occupied by through-holes 13)/(projection area of first main surface PS1 assuming that through-holes 13 are not provided).

The thickness of the filter section 11 is preferably larger than 0.1 times and less than or equal to 100 times a size of the through-hole 13 (one side d). More preferably, the thickness of the filter section 11 is larger than 0.5 times and less than or equal to 10 times the size of the through-hole 13 (one side d). With such a configuration, a resistance of the filtration filter 10 to the liquid can be reduced, and the filtration time can be shortened. As a result, the stress on the objects to be filtered can be reduced.

In the filter section 11, it is preferable that the first main surface PS1 with which the liquid containing the objects to be filtered comes into contact have a small surface roughness. Here, the surface roughness means an average value of a difference between the maximum value and the minimum value measured by a stylus profilometer at any five points on the first main surface PS1. In the filtration filter 10, the surface roughness of the first main surface PS1 is measured at a total of five positions, one in the central side region R11, two in the intermediate region R12, and two in the rim side region R13.

In Embodiment 1, the surface roughness is preferably smaller than the size of the object to be filtered, and is more preferably smaller than half the size of the object to be filtered. Here, the size of the object to be filtered can be defined from an image observed with an optical microscope. For example, when the object to be filtered is a cell, the object is observed by using the optical microscope in which the magnification is set to 100 times or more and 1000 times or less from a direction parallel to a direction in which fluid passes. On the observation image, by setting a horizontal straight line and a perpendicular straight line that maximize lengths of the cell in respective directions, the lengths of the cell in the respective directions are measured. When the length of one of the straight lines in two directions is at least twice the length of the other, the shorter length is regarded as the size of the object to be filtered. Otherwise, the object to be filtered is regarded as an ellipse having two straight lines as a major axis and a minor axis, after an area is obtained, the area is approximated to a circle, and a diameter of the circle is defined as a size of the object to be filtered. Note that the length measured by observing with the optical microscope means an actual length of the object to be filtered in consideration of the magnification of the optical microscope.

In other words, openings of the plurality of through-holes 13 on the first main surface PS1 of the filter section 11 are formed on the same plane (XY plane). Further, the filter base section 14, which is the portion of the filter section 11 in which the through-holes 13 are not formed, is continuous and integrally formed. With this configuration, adhesion of the objects to be filtered to the surface (first main surface PS1) of the filter section 11 is reduced, and the resistance of the liquid can be reduced.

In the through-hole 13, an opening on the first main surface PS1 side and an opening on the second main surface PS2 side are communicated through a continuous wall surface. Specifically, the through-hole 13 is provided such that the opening on the first main surface PS1 side can be projected onto the opening on the second main surface PS2 side. That is, when the filter section 11 is viewed from the first main surface PS1 side, the through-hole 13 is provided such that the opening on the first main surface PS1 side overlaps the opening on the second main surface PS2 side. In Embodiment 1, the through-hole 13 is provided such that the inner wall thereof is perpendicular to the first main surface PS1 and the second main surface PS2.

In addition, a reinforcement layer may be provided on the second main surface PS2 side. Accordingly, the durability of the filtration filter 10 can be improved.

A material constituting the filter base section 14 contains a metal and/or a metal oxide as a main component. The filter base section 14 may be, for example, gold, silver, copper, platinum, nickel, palladium, titanium, an alloy thereof, or an oxide thereof.

<Frame Section>

The frame section 12 is a member disposed so as to surround the outer periphery of the filter section 11. The frame section 12 is formed in a ring shape as viewed from the first main surface PS1 side of the filter section 11. Further, when the filtration filter 10 is viewed from the first main surface PS1 side, a center of the frame section 12 coincides with the center of the filter section 11. That is, the frame section 12 is formed concentrically with the filter section 11.

In Embodiment 1, the thickness T0 of the frame section 12 is formed to be larger than the film thicknesses T1, T2, and T3 of the filter section 11. With such a configuration, mechanical strength of the filtration filter 10 can be increased.

The frame section 12 functions as a connection section that connects the filtration filter 10 and a housing (see Embodiment 2). In Embodiment 1, the housing holds the frame section 12.

Additionally, on the frame section 12, information (for example, the size of the through-hole 13, etc.) on the filter may be indicated. This makes it easier to grasp the filter hole size without measuring it again or the like, and to distinguish between the front and back.

In the frame section 12, a first surface PS3 located on the first main surface PS1 side of the filter section 11 continuously extends in the direction (X, Y direction) from the filter section 11 toward the frame section 12. In the frame section 12, a second surface PS4 located on the second main surface PS2 side of the filter section 11 continuously extends in the direction (X, Y direction) from the filter section 11 toward the frame section 12. "Continuously extending" means extending without bending. In Embodiment 1, the first surface PS3 and the second surface PS4 of the frame section 12 are formed so as to be flat in the radial direction, which is a direction from the center of the filtration filter 10 toward an outside. With such a configuration, the frame section 12 can be easily held.

In Embodiment 1, the filtration filter 10 has a diameter of 7.8 mm, the filter section 11 has a diameter of 6 mm, and the frame section 12 has a width of 0.9 mm. In addition, the film thickness T1 of the central side region R11 of the filter section 11 is 11 μm, the film thickness T3 of the rim side region R13 is 6 μm, and the thickness T0 of the frame section 12 is 15 μm. The filtration filter 10 is not limited to these dimensions, and may be made with other dimensions.

In Embodiment 1, a material constituting the frame section 12 is the same as the material constituting the filter section 11 (filter base section 14).

[Method for Using Filtration Filter]

Figure 5A:
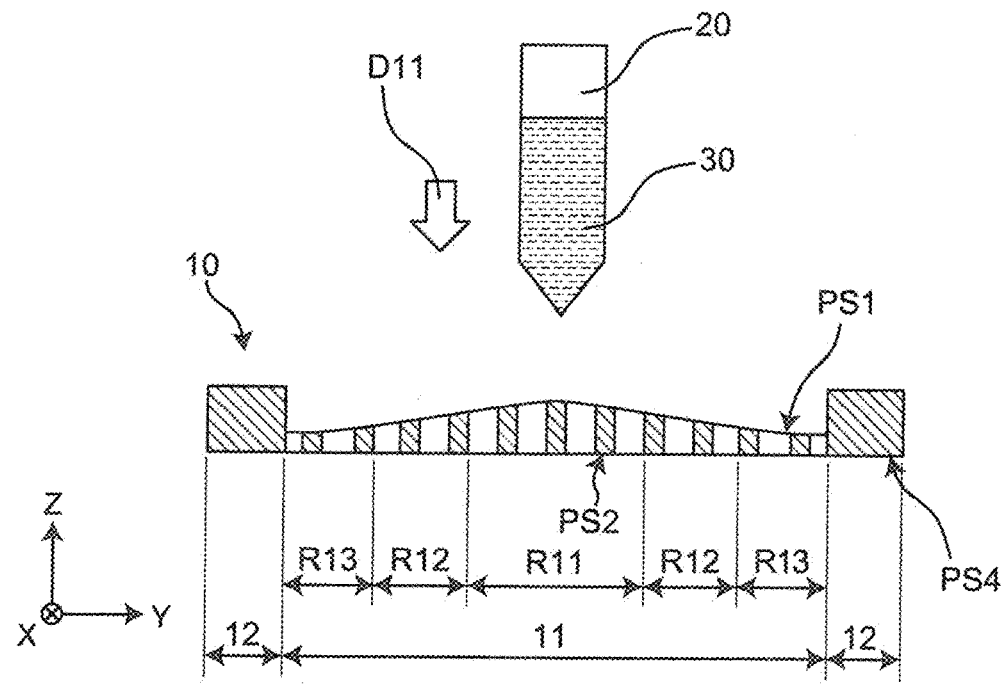
FIG. 5A is a diagram illustrating an example of a process of a method for using the filtration filter of Embodiment 1 according to the present invention.
Figure 5B:
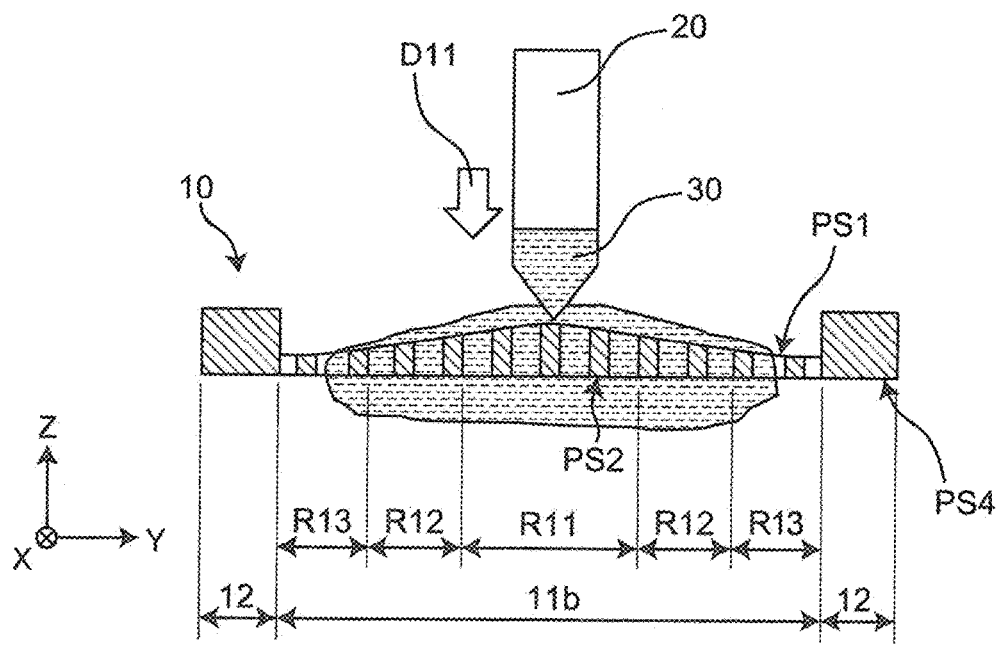
FIG. 5B is a diagram illustrating an example of a process of the method for using the filtration filter of Embodiment 1 according to the present invention.

An example of a method for using the filtration filter 10 will be described with reference to FIGS. 5A and 5B. FIGS. 5A and 5B illustrate examples of the processes of the method for using the filtration filter 10, respectively.

As illustrated in FIG. 5A, a pipette 20 containing a liquid 30 containing cells as objects to be filtered is prepared. Then, in the thickness direction (Z direction) of the filtration filter 10, the pipette 20 is moved in a direction D11 approaching the filtration filter 10.

As illustrated in FIG. 5B, a tip of the pipette 20 is brought into contact with the first main surface PS1 of the filter section 11. Specifically, the tip of the pipette 20 is pressed against the first main surface PS1 of a portion where the film thickness is the largest in the filter section 11. In Embodiment 1, the portion where the film thickness is the largest in the filter section 11 is the central side region R11 of the filter section 11.

Next, the liquid 30 is discharged from the tip of the pipette 20 while the tip of the pipette 20 is pressed against the first main surface PS1 of the filter section 11. Thereby, the liquid 30 contained in the pipette 20 passes through the filter section 11, and the cells are captured on the first main surface PS1 of the filter section 11.

Further, the liquid 30 discharged from the pipette 20 flows along the convex shape on the first main surface PS1 of the filter section 11. That is, when the filtration filter 10 is viewed from the first main surface PS1 side, the liquid 30 flows so as to spread from the center of the filter section 11 toward the outer periphery thereof. As a result, a contact area between the liquid 30 and the filter section 11 is increased, and thus the filtration efficiency can be improved.

[Method for Manufacturing Filtration Filter]

An example of a method for manufacturing the filtration filter 10 will be described with reference to FIGS. 6A to 6F. FIGS. 6A to 6F each is a diagram illustrating an example of a manufacturing process for the filtration filter 10.

Figure 6A:
FIG. 6A is a diagram illustrating an example of a manufacturing process for the filtration filter of Embodiment 1 according to the present invention.

As illustrated in FIG. 6A, a copper thin film 22 is formed on a substrate 21 such as silicon. The copper thin film 22 may be formed by, for example, vapor deposition or sputtering. By sputtering, the surface film quality can be formed well as compared with a case where the film is formed by vapor deposition. At this time, an intermediate layer such as Ti may be formed for a purpose of securing adhesion between the substrate 21 and the copper thin film 22. The copper thin film 22 functions as a power supply film when the filtration filter 10 is formed by an electrolytic plating method described later.

Figure 6B:
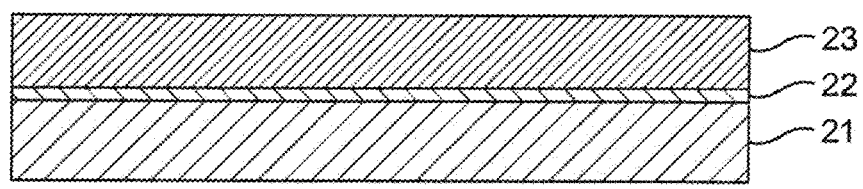
FIG. 6B is a diagram illustrating an example of a manufacturing process for the filtration filter of Embodiment 1 according to the present invention.

As illustrated in FIG. 6B, a resist film 23 is formed on the copper thin film 22. Specifically, the resist film 23 is formed on the copper thin film 22 by applying a resist by, for example, spin coating, and then by performing a drying process. The film thickness of the resist film 23 is appropriately set according to the thickness of the filtration filter 10.

Figure 6C:
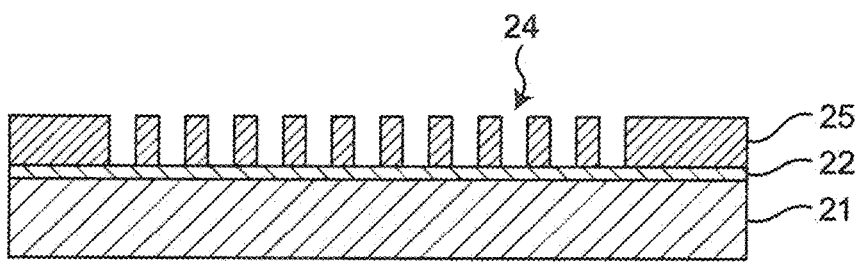
FIG. 6C is a diagram illustrating an example of a manufacturing process for the filtration filter of Embodiment 1 according to the present invention.

As illustrated in FIG. 6C, the resist film 23 is exposed and developed, and a resist image 25 having a groove portion 24 is formed by removing a portion corresponding to the filtration filter 10 from the resist film 23.

Figure 6D:
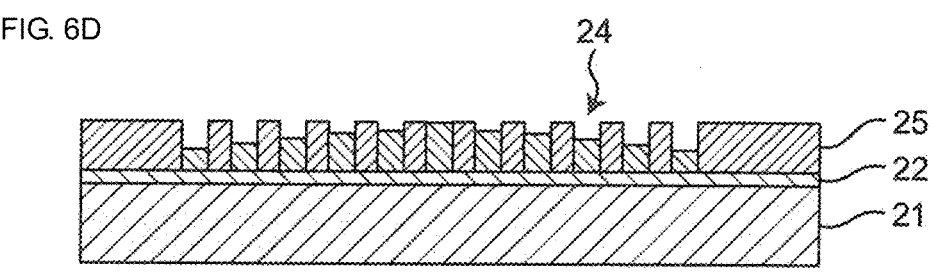
FIG. 6D is a diagram illustrating an example of a manufacturing process of the filtration filter of Embodiment 1 according to the present invention.

As illustrated in FIG. 6D, the filtration filter 10 is formed in the portion where the resist film 23 is removed. The filtration filter 10 may be formed by, for example, an electrolytic plating method (electroforming). When the plating is performed by the electrolytic plating method, the plating time is set to be long. Specifically, a rise time for plating is set to be long. The rise time for plating means a time from when the plating is started until a temperature of plating solution reaches a set temperature.

Conditions for forming the filtration filter 10 by the electrolytic plating method are as follows.

Plating solution: Nickel sulfamate plating solution
pH value: 3.7 to 4.1
Temperature of plating solution: 55° C.
Plating time: Rising time 0 to 60 s (preferably 10 s)
Stable zone 20 to 60 min (preferably 20 min)
Current setting value: 0.5 to 3 A (preferably 2 A)
Volume of plating bath: 8 L
Agitation speed of bath liquid: 3 L/min to 40 L/min (preferably 29 L/min)

Figure 6E:
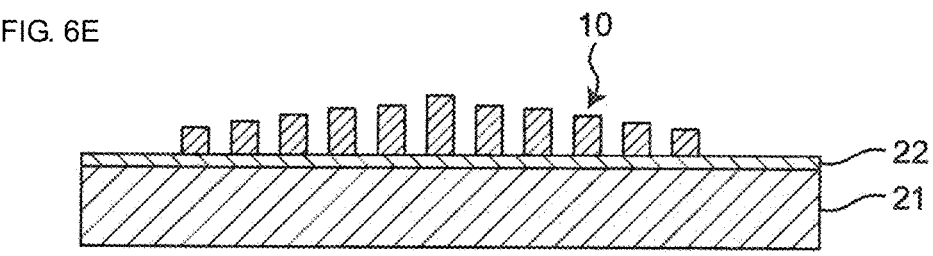
FIG. 6E is a diagram illustrating an example of a manufacturing process of the filtration filter of Embodiment 1 according to the present invention.

As illustrated in FIG. 6E, the resist image 25 is dissolved and peeled off by performing immersion in a solvent (for example, acetone and the like) to remove the resist image 25 from the copper thin film 22.

Figure 6F:
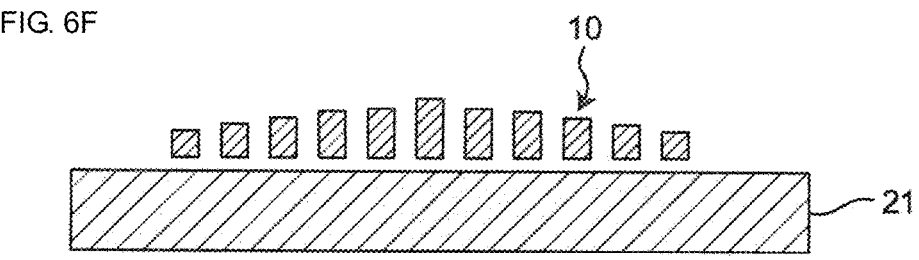
FIG. 6F is a diagram illustrating an example of a manufacturing process of the filtration filter of Embodiment 1 according to the present invention.

As illustrated in FIG. 6F, the copper thin film 22 is removed by etching, and the filtration filter 10 is peeled off from the substrate 21. Accordingly, the filtration filter 10 is produced.

The manufacturing method described with reference to FIGS. 6A to 6F is an example, and other manufacturing methods may be adopted as the manufacturing method of the filtration filter 10.

[Effect]

According to the filtration filter 10 according to Embodiment 1, the following effects can be obtained.

The filtration filter 10 has the filter section 11 having the convex shape that protrudes out from the first main surface PS1 side that captures the objects to be filtered. Specifically, the film thickness T1 of the filter section 11 in the central side region R11 away from the frame section 12 is larger than the film thickness T3 of the filter section 11 in the rim side region R13 closer to the frame section 12 than the central side region R11. That is, the film thickness T1 at the center P1 of the filter section 11 is formed to be larger than the film thickness T3 of the filter section 11 at the position closer to the frame section 12 than the center P1 of the filter section 11.

With such a configuration, durability can be improved.

For example, it is more effective when the pipette 20 is pressed against the filtration filter 10 to perform filtration. Specifically, in the filter section 11 of the filtration filter 10, it is possible to suppress the filtration filter 10 from being damaged by pressing the pipette 20 against the portion where the film thickness is largest, that is, the center P1 of the filter section 11 to perform filtration. Further, the liquid 30 containing the objects to be filtered flows from the central side region R11 of the filter section 11 toward the rim side region R13. That is, the liquid 30 flows from the center P1 toward the radially outer side of the filter section 11, that is, the liquid flows to spread toward the frame section 12 side, and the contact area between the liquid 30 and the filter section 11 is made to be increased. As a result, the liquid 30 easily passes through the through-holes 13 of the filter section 11, and the filtration efficiency is improved.

The second main surface PS2 of the filter section 11 has the flat shape. With such a configuration, the liquid that has passed through the through-holes 13 falls downward as it is, and the processing speed becomes fast. On the other hand, when the second main surface PS2 has a convex shape or concave shape downward, the liquid passing through the through-holes 13 flows along the second main surface PS2 in an in-plane direction and then falls, so that the processing speed becomes slow when the liquid having high viscosity is used. As described above, by flattening the second main surface PS2 of the filter section 11, the liquid 30 is easily discharged from the plurality of through-holes 13. As a result, the filtration time can be shortened.

The filter section 11 has a substantially circular shape, and the frame section 12 has the ring shape surrounding the outer periphery of the filter section 11. With such a configuration, a stress generated in the filter section 11 can be further dispersed.

[Stress Analysis Simulation]

Results of a stress analysis simulation of the filtration filter 10 will be described. The stress analysis simulation was performed using Femtet manufactured by Murata Manufacturing Co., Ltd.

Figure 7:
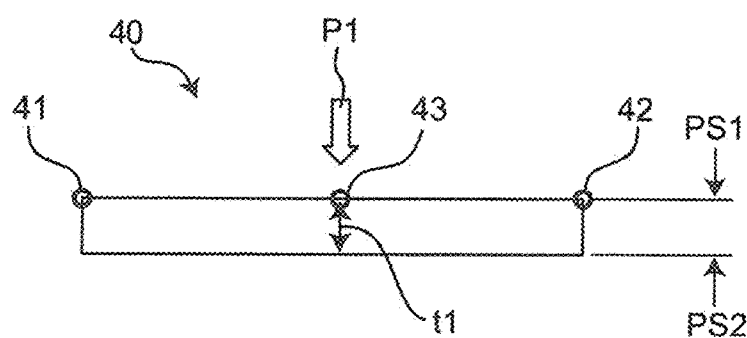
FIG. 7 is a schematic diagram of a two-dimensional model of a filtration filter used in a stress analysis simulation.

FIG. 7 illustrates a schematic diagram of a two-dimensional model 40 of a filtration filter used for the stress analysis simulation. As illustrated in FIG. 7, the two-dimensional model 40 was used for the stress analysis because a shape of the filtration filter 10 has symmetry. The two-dimensional model 40 used for the stress analysis had a width of 200 μm and a thickness of 10 μm at end portions 41 and 42, and a thickness t1 of a central portion 43 was changed as a parameter. Further, the material constituting the two-dimensional model 40 was set to Ni.

In Embodiment 1, a diameter (width) of the filter section 11 is 6 mm, whereas a width of the two-dimensional model 40 is set to 200 μm. However, there is no significant influence on the analysis result. Even when the analysis is performed by setting the width of the two-dimensional model 40 to 6 mm, similar results as analyzed results described below can be obtained.

Specifically, with the second main surface PS2 of the two-dimensional model 40 maintained flat, the thickness t1 of the central portion 43 was changed by 1 μm from 5 μm to 20 μm. That is, when the thickness t1 of the central portion 43 is 5 to 9 μm, the two-dimensional model 40 is formed in a concave shape. When the thickness t1 of the central portion 43 is 10 μm, the two-dimensional model 40 is formed in a flat shape. When the thickness t1 of the central portion 43 is 11 to 15 μm, the two-dimensional model 40 is formed in a convex shape. In addition, when the thickness t1 of the central portion 43 is 5 to 9 μm or 11 to 15 μm, the first main surface PS1 of the two-dimensional model 40 is formed in an arc shape connecting three points of the end portions 41 and 42 and the central portion 43.

In the stress analysis, the stress generated in the two-dimensional model 40 when a load P1 is applied to the central portion 43 with the end portions 41 and 42 of the two-dimensional model 40 fixed is calculated. The load P1 is applied from the first main surface PS1 side. Magnitude of the load P1 is set to $1.0 \times 10^{-4}$ N.

Figure 8:
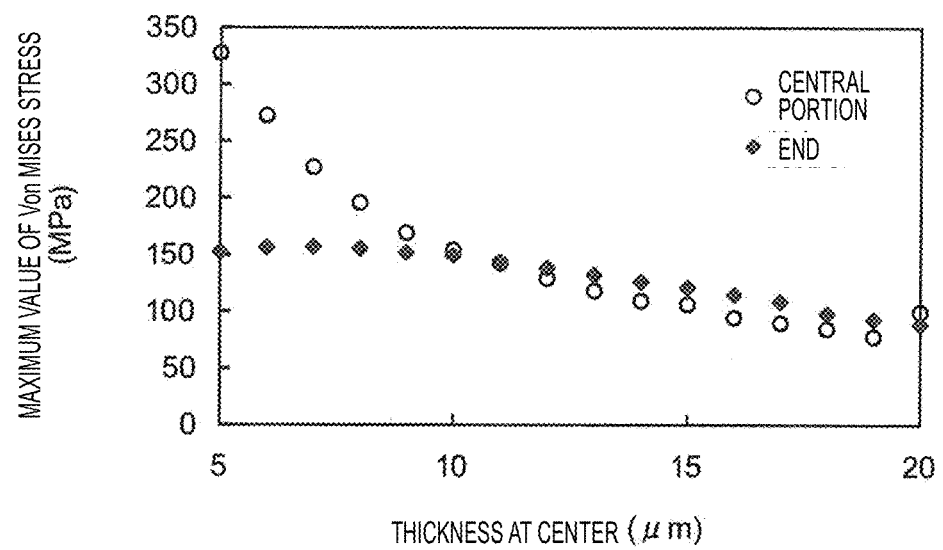
FIG. 8 is a diagram illustrating results of calculating von Mises stress using the two-dimensional model illustrated in FIG. 7.

FIG. 8 illustrates results of calculating von Mises stress by using the two-dimensional model illustrated in FIG. 7. As illustrated in FIG. 8, as the thickness t1 of the central portion 43 of the two-dimensional model 40 increases, the stress generated in the central portion 43 decreases. That is, the stress in the portion to which the load P1 is applied decreases.

Figures 9, 10A:
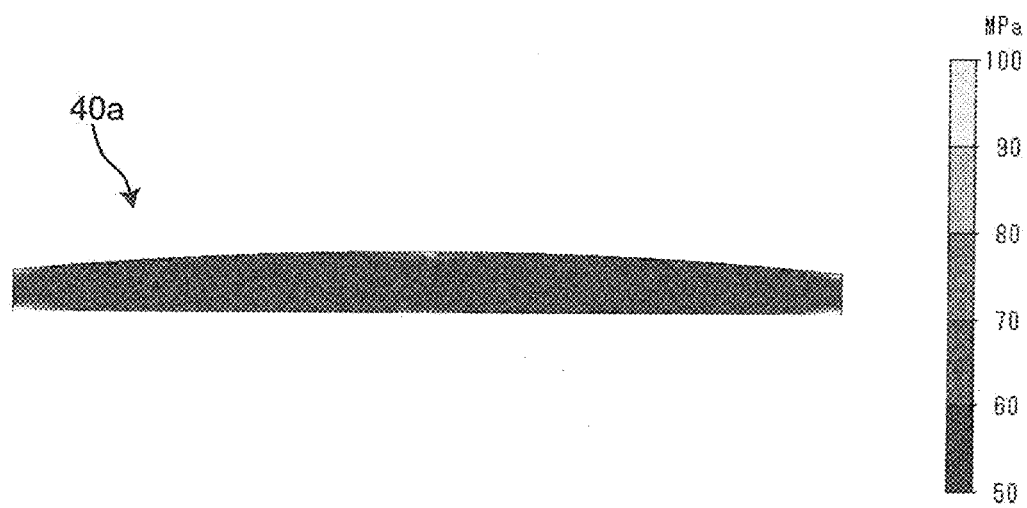
FIG. 9 is a table illustrating a position where the von Mises stress becomes maximum when a thickness in a central portion of the two-dimensional model is used as a parameter.
FIG. 10A is a diagram illustrating a result of stress analysis when a load is applied to a two-dimensional model of a filtration filter having a convex shape.

FIG. 9 illustrates a position where the von Mises stress is the maximum when the thickness t1 of the central portion 43 of the two-dimensional model 40 of the filtration filter is used as a parameter. As illustrated in FIG. 9, when the thickness t1 of the central portion 43 of the two-dimensional model 40 is 10 μm or less, the position where the von Mises stress is the maximum is the central portion 43. When the thickness t1 of the central portion 43 of the two-dimensional model 40 is larger than or equal to 11 μm and smaller than or equal to 19 μm, the position where the von Mises stress is the maximum is the end portion 41 or 42. When the thickness t1 of the central portion 43 of the two-dimensional model 40 is 20 μm, the position where the von Mises stress is the maximum is the central portion 43. Note that the thickness of the end portions 41 and 42 is constant at 10 μm. From this, it is considered that the stress can be dispersed when the thickness t1 of the central portion 43 in the two-dimensional model 40 is 1.1 times or more and 1.9 times or less the thickness of the end portions 41 and 42.

As described above, when the two-dimensional model 40 is formed in a convex shape, the stress generated in the portion (the central portion 43) to which the load P1 is applied can be reduced as compared with the concave shape and the flat shape. In other words, when the two-dimensional model 40 is formed in the convex shape, the stress generated in the filtration filter by applying the load P1 can be dispersed as compared with the concave shape and the flat shape.

Figure 10B:
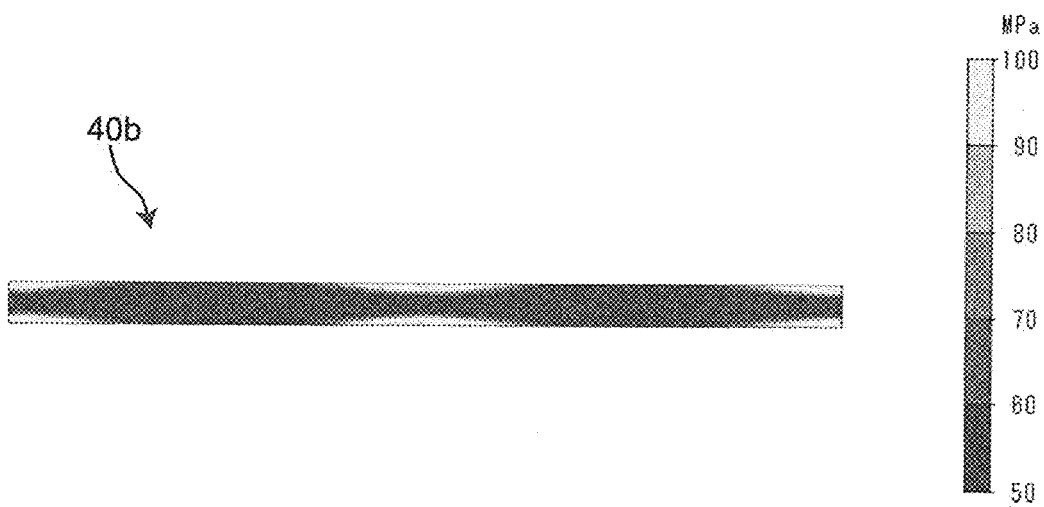
FIG. 10B is a diagram illustrating a result of stress analysis when a load is applied to a two-dimensional model of a filtration filter having a flat shape.
Figure 10C:
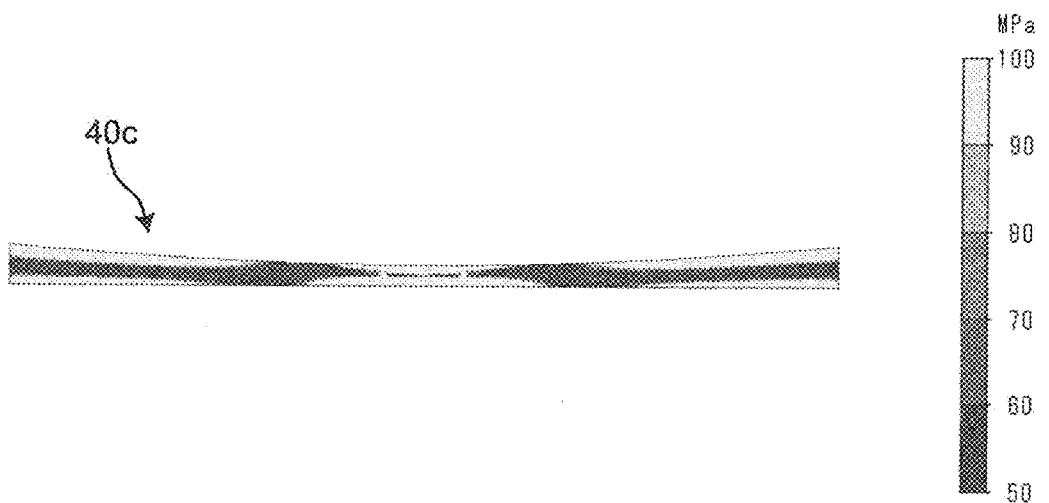
FIG. 10C is a diagram illustrating a result of stress analysis when a load is applied to a two-dimensional model of a filtration filter having a concave shape.

FIGS. 10A to 10C illustrate results of the stress analysis when the load P1 is applied to two-dimensional models 40a, 40b, and 40c of filtration filters having a convex shape, a flat shape, and a concave shape, respectively. FIGS. 10A to 10C each illustrates the stress distribution when the load P1 is applied. The thicknesses t1 of the central portion 43 of the two-dimensional models 40a, 40b, and 40c are 15 μm, 10 μm, and 5 μm, respectively.

As illustrated in FIG. 10A, in the two-dimensional model 40a of the filtration filter having the convex shape, when the load P1 is applied to the central portion 43, the stress is evenly dispersed over almost the entire two-dimensional model 40a.

On the other hand, in the two-dimensional models 40b and 40c of the filtration filters having the flat shape and the concave shape, as illustrated in FIGS. 10B and 10C, when the load P1 is applied to the central portion 43, there are many places on which the stress concentrates.

Specifically, in the two-dimensional models 40b and 40c, the stress concentrates on the central portion 43, and a larger stress is generated compared with the two-dimensional model 40a.

From the above description, by forming the filter section 11 of the filtration filter 10 in a convex shape, it is possible to disperse the stress when a load is applied to the first main surface PS1. Accordingly, the filtration filter 10 can improve durability.

Note that, in Embodiment 1, the example in which the filtration filter 10 is the metal filter is described, but the present invention is not limited thereto. The filtration filter 10 may be any filter capable of filtering the objects to be filtered contained in the liquid 30, and may be another filter such as a membrane, for example.

In Embodiment 1, the example in which the first main surface PS1 of the filter section 11 is continuously changed in film thickness has been described, but the present invention is not limited thereto. For example, the film thickness of the first main surface PS1 of the filter section 11 may change stepwise.

In Embodiment 1, the example has been described in which the second main surface PS2 of the filter section 11 has the flat shape, but the present invention is not limited thereto. The second main surface PS2 of the filter section 11 may not be flat. For example, the filter section 11 may protrude toward the second main surface PS2 side of the filter section 11. Alternatively, the filter section 11 may be recessed from the second main surface PS2 toward the first main surface PS1 of the filter section 11. Even with such configurations, when the film thickness T1 at the center P1 of the filter section 11 is formed to be larger than the film thickness T3 of the filter section 11 at the position closer to the frame section 12 than the center P1 of the filter section 11, it is possible to improve the durability of the filtration filter 10.

In Embodiment 1, the example of the method for using the filtration filter 10 using the pipette 20 has been described, but the present invention is not limited thereto. The filtration filter 10 may be used for filtration without using the pipette 20.

In Embodiment 1, the example has been described in which the filter section 11 has the largest film thickness in the central side region R11, but the present invention is not limited thereto. The filter section 11 may have the largest film thickness in the intermediate region R12.

In Embodiment 1, the example has been described in which the film thickness T1 of the central side region R11, which is the portion where the film thickness is largest in the filter section 11, is smaller than the thickness T0 of the frame section 12, but the present invention is not limited thereto.

Figure 11:
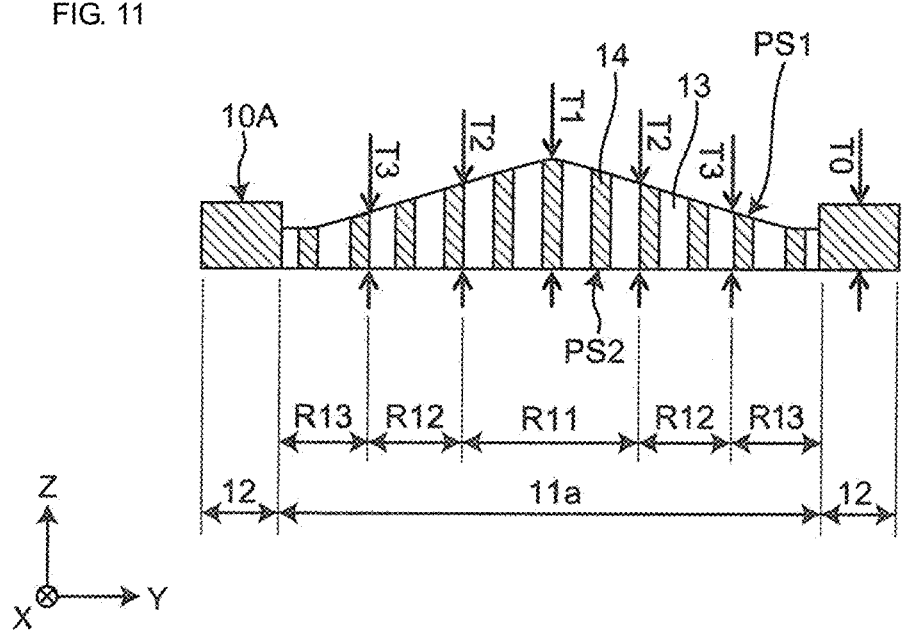
FIG. 11 is a schematic configuration diagram of a filtration filter of a modification of Embodiment 1 according to the present invention.

FIG. 11 illustrates a schematic configuration diagram of a filtration filter 10A of a modification of Embodiment 1 according to the present invention. As illustrated in FIG. 11, in the filtration filter 10A, the film thickness T1 of a filter section 11a in the central side region R11 may be larger than the thickness T0 of the frame section 12. That is, the film thickness T1 at the center P1 of the filter section 11a may be larger than the thickness T0 of the frame section 12. With such a configuration, the durability of the filtration filter 10A can be further improved.

In Embodiment 1, the example has been described in which the film thickness T3 of the filter section 11 in the rim side region R13 is smaller than the thickness T0 of the frame section 12, but the present invention is not limited thereto.

Figure 12:
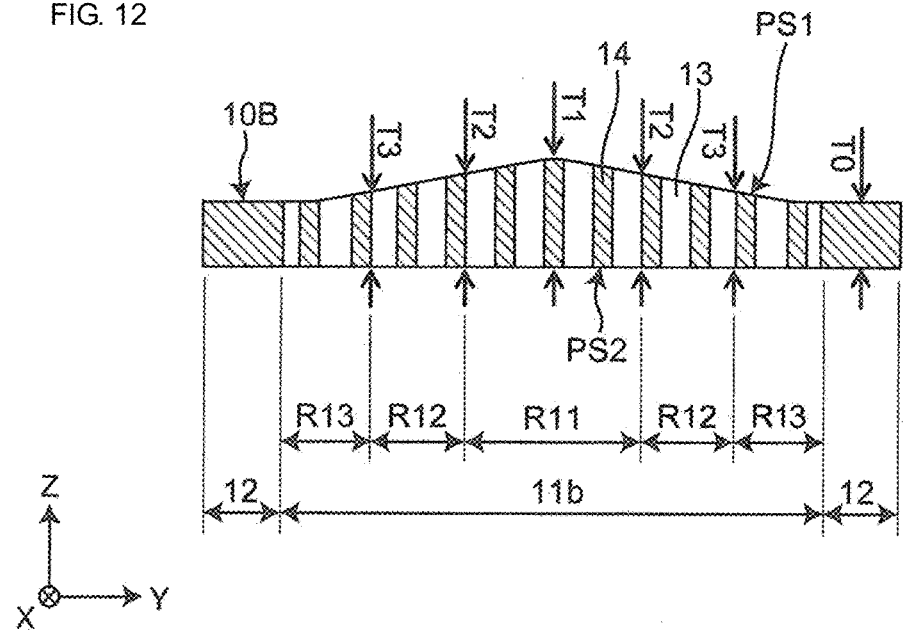
FIG. 12 is a schematic configuration diagram of a filtration filter of another modification of Embodiment 1 according to the present invention.

FIG. 12 is a schematic configuration diagram of a filtration filter 10B of another modification of Embodiment 1 according to the present invention. As illustrated in FIG. 12, in the filtration filter 10B, the film thickness T3 of a filter section 11b in the rim side region R13 may be larger than the thickness T0 of the frame section 12. That is, the film thickness T3 of the filter section 11b at the position closer to the frame section 12 than the center P1 of the filter section 11b may be larger than the thickness T0 of the frame section 12. For example, a shape may be such that the first main surface PS1 of the filter section 11b in the rim side region R13 is connected to an upper surface of the frame section 12 in a continuously extended state. The shape connected in a continuously extended state means a shape in which the first main surface PS1 continuously changes and is connected to the upper surface of the frame section 12. With such a configuration, the durability of the filtration filter 10B can be further improved.

Figure 13A:
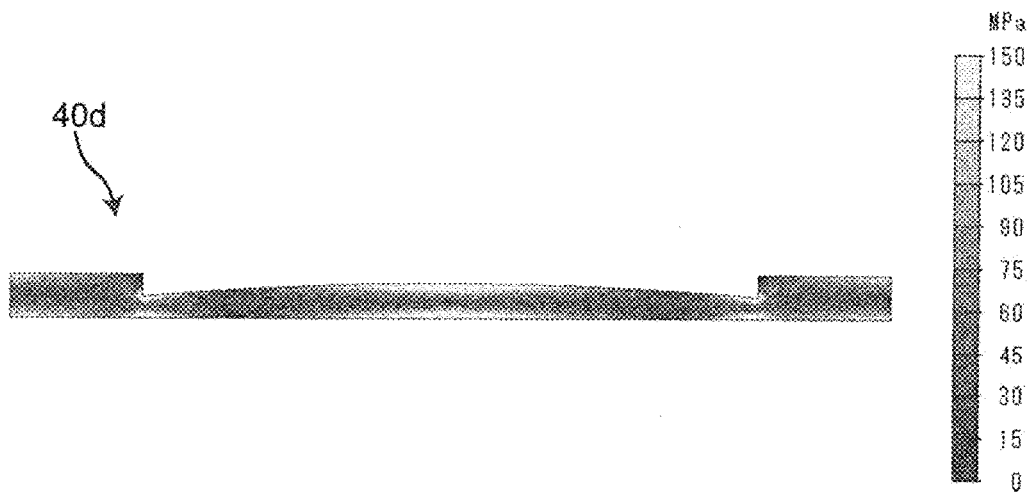
FIG. 13A is a diagram illustrating a result of stress analysis when a load is applied to a two-dimensional model of the filtration filter of Embodiment 1 according to the present invention.
Figure 13B:
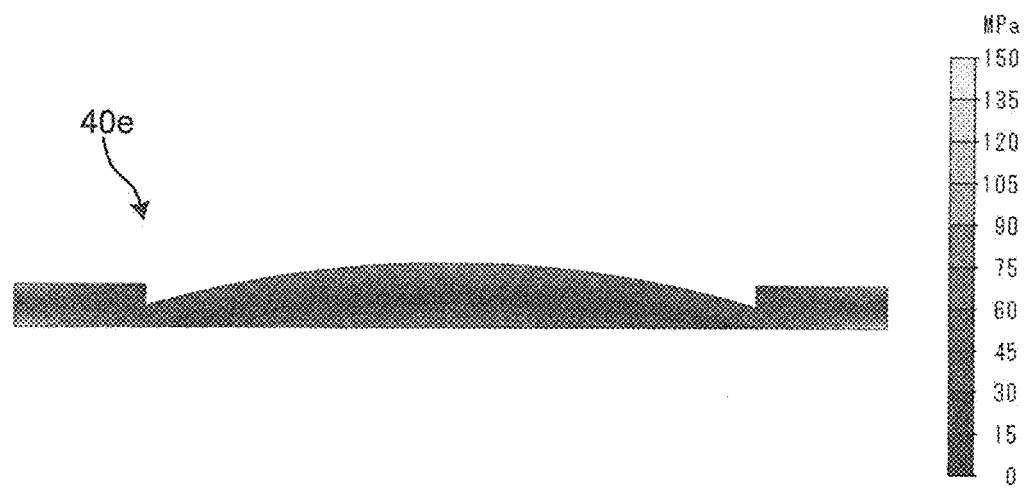
FIG. 13B is a diagram illustrating a result of stress analysis when a load is applied to a two-dimensional model of the filtration filter of the modification of Embodiment 1 according to the present invention.
Figure 13C:
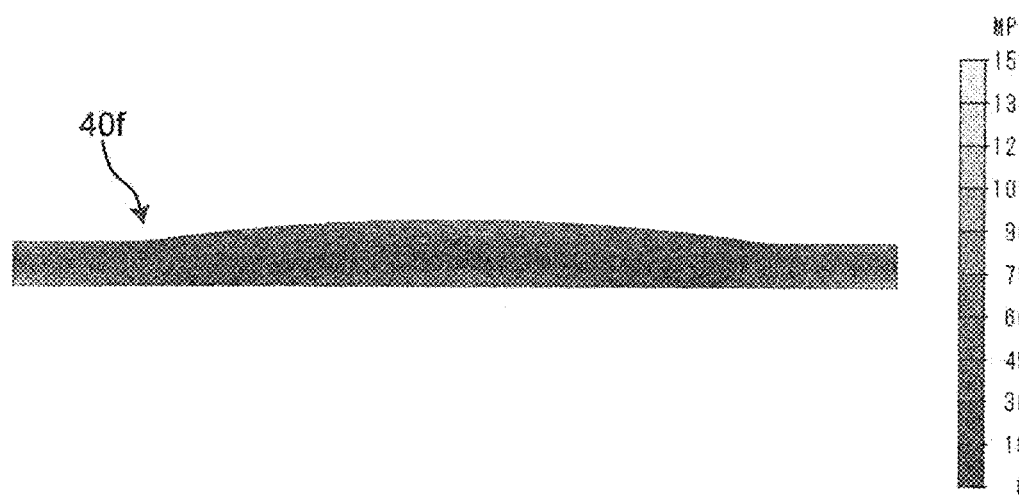
FIG. 13C is a diagram illustrating a result of stress analysis when a load is applied to a two-dimensional model of the filtration filter of the other modification of Embodiment 1 according to the present invention.

FIGS. 13A to 13C illustrate results of the stress analysis when the load P1 is applied to two-dimensional models 40d, 40e, and 40f of the filtration filters 10, 10A, and 10B, respectively. The stress analyses illustrated in FIGS. 13A to 13C were performed under the same conditions as those in the above-described [Stress Analysis Simulation]. The two-dimensional models 40d, 40e, and 40f reproduce two-dimensional shapes of the filtration filters 10, 10A, and 10B, respectively.

As illustrated in FIGS. 13A to 13C, when the load P1 is applied to the central portion 43, in the two-dimensional models 40e and 40f, the stress is dispersed almost entirely as compared with the two-dimensional model 40d. In particular, the stresses generated in the filter section 11a and 11b in the two-dimensional models 40e and 40f are more evenly dispersed than in the two-dimensional model 40d.

Since the filtration filters 10A and 10B can disperse the stress as compared with the filtration filter 10, durability can be further improved as compared with the filtration filter 10.

Embodiment 2

A filtration device of Embodiment 2 according to the present invention will be described.

In Embodiment 2, different points from Embodiment 1 will be mainly described. In Embodiment 2, configurations that are the same as or equivalent to those in Embodiment 1 will be described using the same reference symbols. In addition, in Embodiment 2, description overlapping with Embodiment 1 will be omitted.

In Embodiment 2, the filtration device including the filtration filter 10 of Embodiment 1 will be described with reference to FIGS. 14 to 18.

Figure 14:
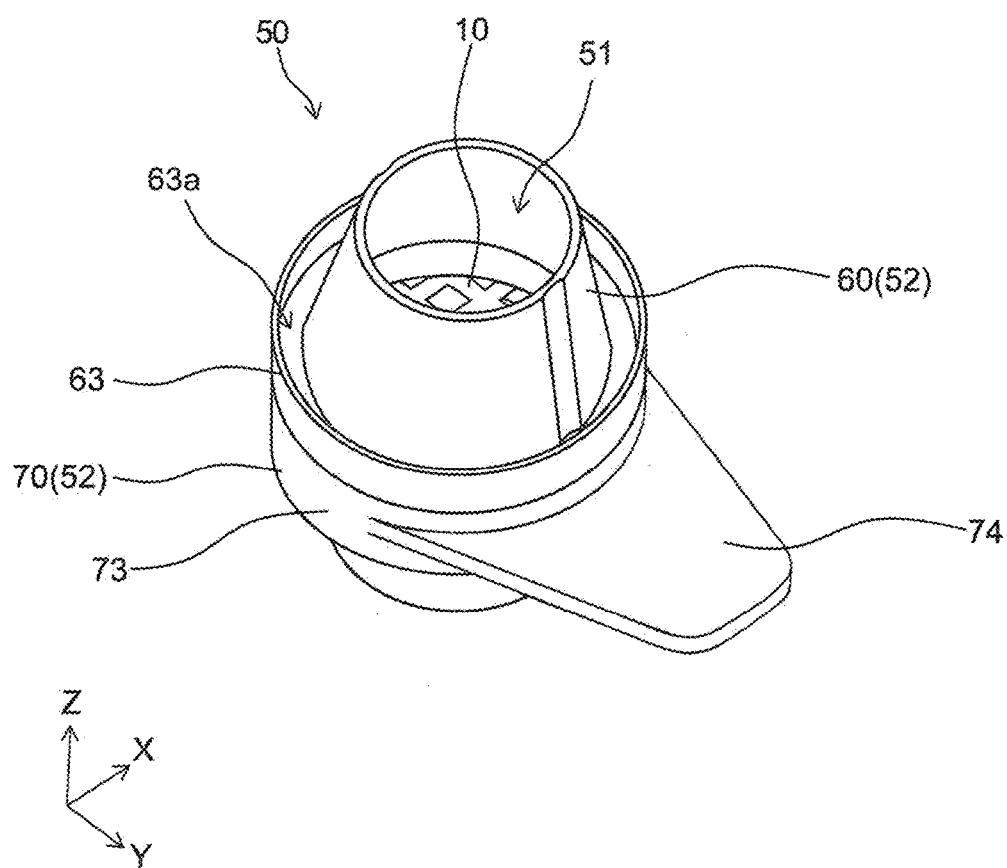
FIG. 14 is a schematic perspective view of an example of a filtration device of Embodiment 2 according to the present invention.
Figure 15:
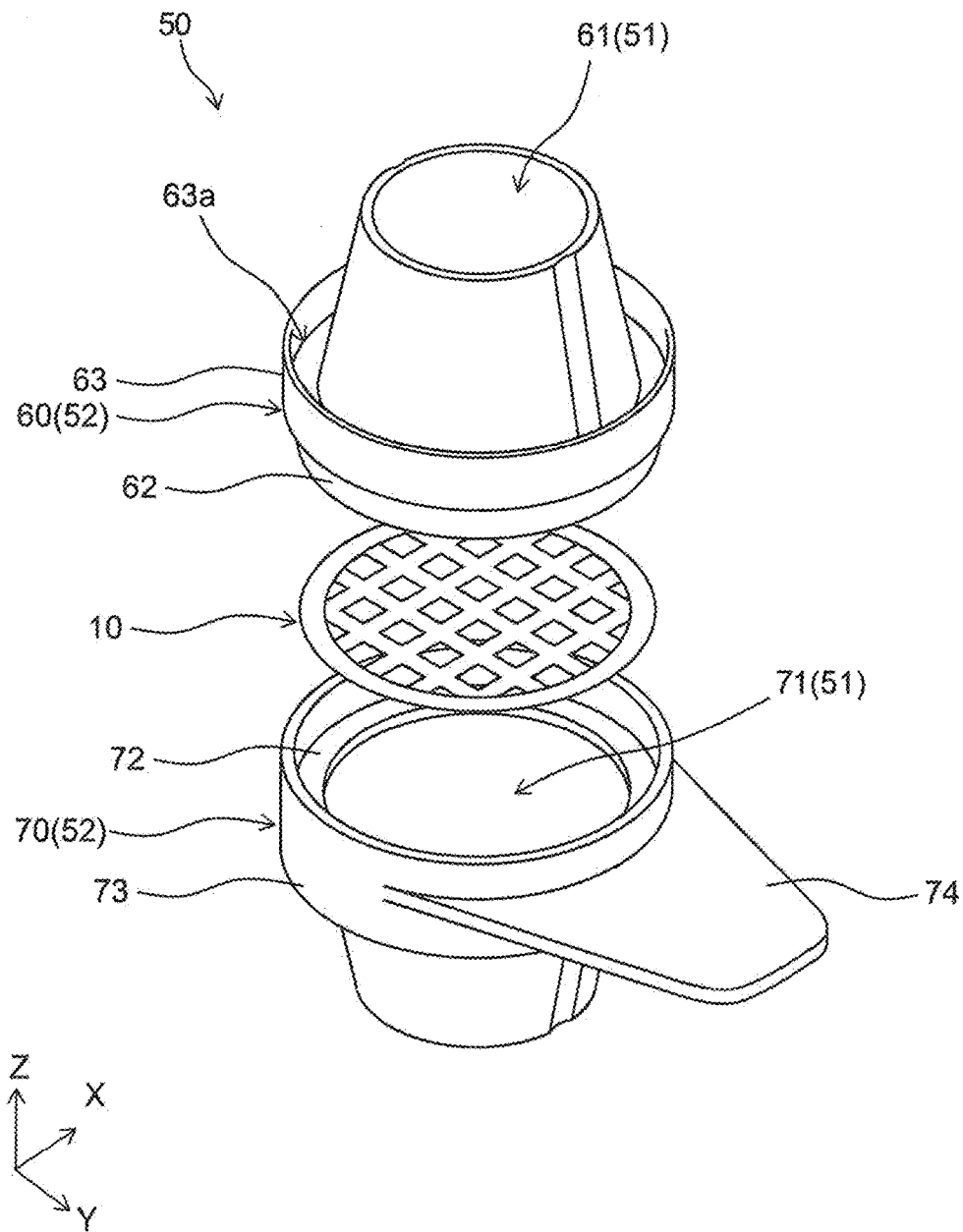
FIG. 15 is a schematic exploded view of the example of the filtration device of Embodiment 2 according to the present invention.
Figure 16:
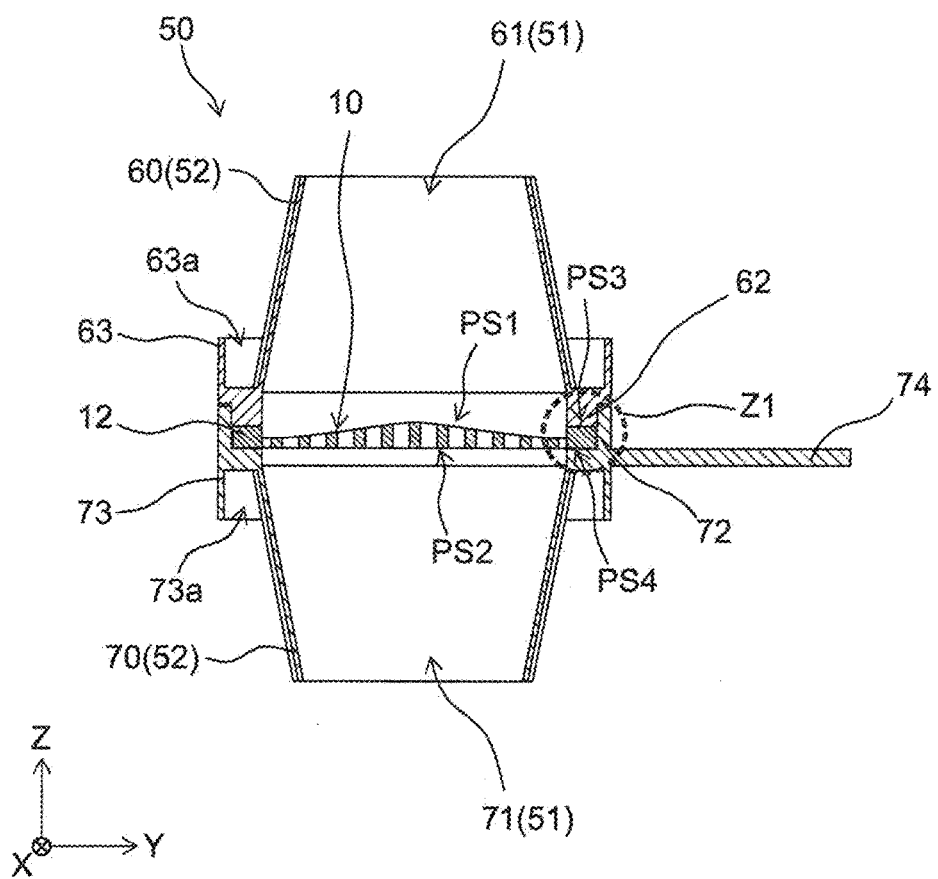
FIG. 16 is a schematic sectional view of the example of the filtration device of Embodiment 2 according to the present invention.

FIG. 14 is a schematic perspective view of an example of a filtration device 50 of Embodiment 2 according to the present invention. FIG. 15 is a schematic exploded view of the example of the filtration device 50. FIG. 16 is a schematic sectional view of the example of the filtration device 50.

As illustrated in FIGS. 14 to 16, the filtration device 50 includes the filtration filter 10, and a housing 52 defining a flow path 51 through which the liquid flows, and holding the filtration filter 10 in the flow path 51.

<Housing>

The housing 52 includes a first housing section 60 and a second housing section 70 which fits with the first housing section 60. The housing 52 holds the filtration filter 10 in the flow path 51 by fitting the first housing section 60 to the second housing section 70 with the filtration filter 10 interposed therebetween. Specifically, the housing 52 sandwiches the frame section 12 of the filtration filter 10 in a thickness direction (Z direction) by the first housing section 60 and the second housing section 70. The housing 52 is provided with a groove which serves as a gas flow path between the housing 52 and a container.

The first housing section 60 has a first flow path 61 which faces the first main surface PS1 of the filter section 11 of the filtration filter 10 inside. The first flow path 61 is a flow path through which a liquid containing objects to be filtered flows during filtration, and constitutes a part of the flow path 51 of the housing 52. Specifically, the first housing section 60 is formed in a cylindrical shape.

In Embodiment 2, a width, that is, a diameter, of the first housing section 60 becomes small toward a side opposite to a side which fits with the second housing section 70.

The first housing section 60 has a portion that is in contact with the first surface PS3 of the frame section 12 of the filtration filter 10 on the side which fits with the second housing section 70. Specifically, in the first housing section 60, a flat surface, which is in contact with the first surface PS3 of the frame section 12, is formed at an end portion on the side which fits with the second housing section 70. As described in Embodiment 1, the first surface PS3 of the frame section 12 is formed so as to be flat without being bent. Therefore, the flat surface of the first housing section 60 is in surface contact with the flat first surface PS3 of the frame section 12.

More specifically, the first housing section 60 has a convex stepped portion 62 at the end portion on the side which fits with the second housing section 70. The convex stepped portion 62 protrudes in a direction from the first housing section 60 toward the second housing section 70. A convex surface of the convex stepped portion 62 is formed to be flat. The convex surface of the convex stepped portion 62 means a surface protruding in the direction from the first housing section 60 toward the second housing section 70 in the convex stepped portion 62. Therefore, the convex surface of the convex stepped portion 62 is in contact with the first surface PS3 of the frame section 12.

The first housing section 60 also has a first flange portion 63 extending outward from a side wall of the first housing section 60. The first flange portion 63 has a first groove 63a recessed in the direction from the first housing section 60 toward the second housing section 70 when viewed from an upper side of the first housing section 60. The first groove 63a is formed in a ring shape so as to surround the side wall of the first housing section 60.

A width (length in X and Y directions) of the first housing section 60 is formed so as to be able to be accommodated in a container such as a centrifuge tube. On the other hand, the first flange portion 63 is formed with a size larger than an opening of the container.

For example, when backwashing the filtration filter 10 held in the filtration device 50, the filtration device 50 is turned upside down and attached to the container such as the centrifuge tube. At this time, the first housing section 60 is housed inside the container, and the first flange portion 63 engages with an opening end portion of the container. Thereby, the filtration device 50 can be held in the opening of the container with the first housing section 60 being down. As a result, the filtration filter 10 can be easily backwashed.

Further, the first groove 63a engages with the opening end portion of the container, so that the filtration device 50 can be stably held in the opening of the container.

The second housing section 70 has a second flow path 71 which faces the second main surface PS2 of the filter section 11 of the filtration filter 10 inside. The second flow path 71 is a flow path through which the liquid that has passed through the filtration filter 10 flows out during filtration, and constitutes a part of the flow path 51. Specifically, the second housing section 70 is formed in a cylindrical shape.

In Embodiment 2, a width, that is, a diameter, of the second housing section 70 becomes small toward a side opposite to a side which fits with the first housing section 60.

The second housing section 70 has a portion that is in contact with the second surface PS4 of the frame section 12 of the filtration filter 10 on the side which fits with the first housing section 60. Specifically, in the second housing section 70, a flat surface, which is in contact with the second surface PS4 of the frame section 12, is formed at an end portion on the side which fits with the first housing section 60. As described in Embodiment 1, the second surface PS4 of the frame section 12 is formed to be flat. Therefore, the flat surface of the second housing section 70 is in surface contact with the flat second surface PS4 of the frame section 12.

More specifically, the second housing section 70 has a concave stepped portion 72 at the end portion on the side which fits with the first housing section 60. The concave stepped portion 72 is recessed in the direction from the first housing section 60 toward the second housing section 70. A concave surface of the concave stepped portion 72 is formed to be flat. The concave surface of the concave stepped portion 72 means a surface recessed in the direction from the first housing section 60 toward the second housing section 70 in the concave stepped portion 72. The concave surface of the concave stepped portion 72 is in contact with the second surface PS4 of the frame section 12.

Further, the second housing section 70 has a second flange portion 73 extending outward from a side wall of the second housing section 70. The second flange portion 73 has a second groove 73a recessed in a direction from the second housing section 70 toward the first housing section 60 when viewed from a lower side of the second housing section 70. The second groove 73a is formed in a ring shape along the side wall of the second housing section 70.

A width dimension (length in X and Y directions) of the second housing section 70 is formed to be smaller than the opening of the container such as the centrifuge tube, except for the second flange portion 73. That is, the second flange portion 73 has a size larger than the opening of the container. With such a configuration, by engaging the second flange portion 73 with the container, the filtration device 50 can be easily attached to the container to perform filtration.

Specifically, when the filtration device 50 is attached to the container to perform filtration, the second housing section 70 is housed inside the container, and the second flange portion 73 is in contact with the opening end portion of the container. Thereby, the filtration device 50 can be held in the opening of the container with the second housing section 70 being down during filtration.

Further, the second groove 73a engages with the opening end portion of the container, so that the filtration device 50 can be stably held in the opening of the container.

The second housing section 70 has a handle 74. The handle 74 extends outward from a portion of the side wall of the second housing section 70. In Embodiment 2, the handle 74 extends outward from a portion of the second flange portion 73. The handle 74 has a trapezoidal shape when the second housing section 70 is viewed from a lower side.

[Holding Structure of Filtration Filter]

A holding structure of the filtration filter 10 in the filtration device 50 will be described with reference to FIG. 17.

Figure 17:
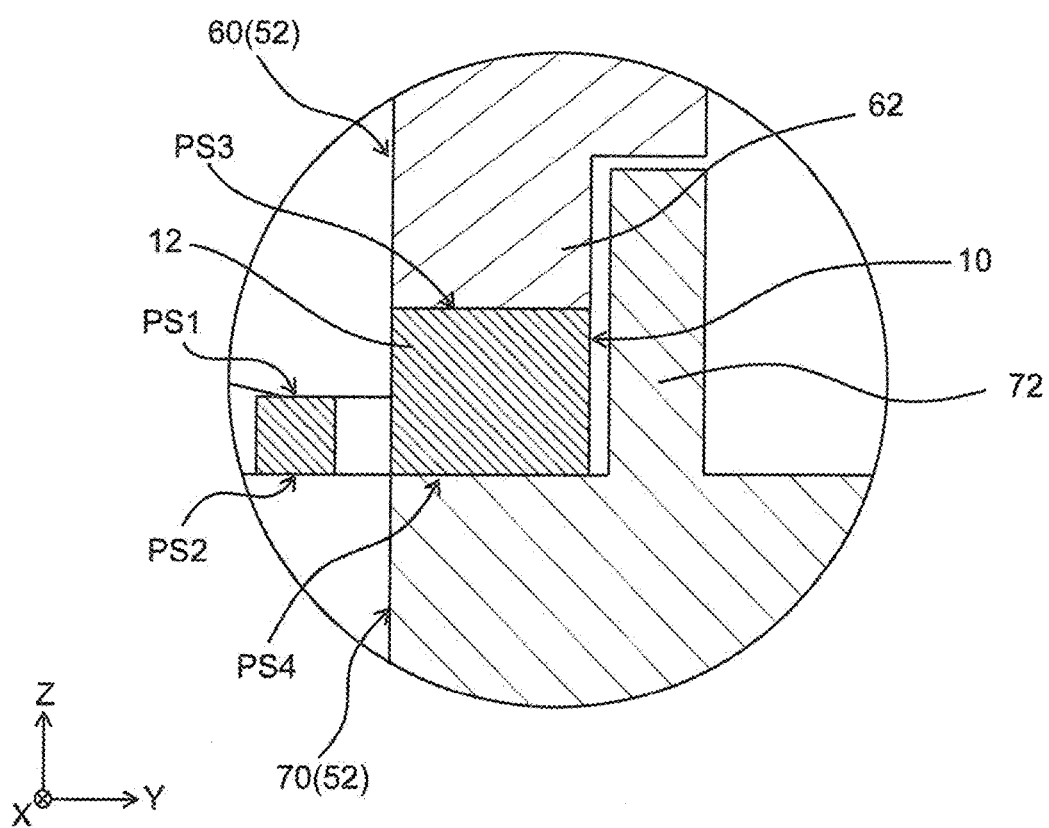
FIG. 17 is an enlarged view of a Z1 portion of the filtration device in FIG. 16.

FIG. 17 is an enlarged view of a Z1 portion of the filtration device 50 in FIG. 16. As illustrated in FIG. 17, the filtration filter 10 is held by the first housing section 60 and the second housing section 70.

The first housing section 60 is configured to fit with the second housing section 70 with the frame section 12 of the filtration filter 10 interposed therebetween, and the frame section 12 of the filtration filter 10 is sandwiched in the thickness direction (Z direction) in a fitted state. In addition, the frame section 12 of the filtration filter 10 is held by the first housing section 60 and the second housing section 70 in a state of continuously extending in the direction (X, Y direction) from the filter section 11 toward the frame section 12. Thereby, the filtration device 50 holds the filtration filter 10 in the flow path 51 of the housing 52.

"Held by the first housing section 60 and the second housing section 70 in a state of continuously extending in the direction (X, Y direction) from the filter section 11 toward the frame section 12" means that a portion extending in the direction (X, Y direction) from the filter section 11 to the frame section 12 is held by the first housing section 60 and the second housing section 70 without being bent in the frame section 12 of the filtration filter 10. In other words, it means that the portion of the frame section 12 held by the first housing section 60 and the second housing section 70 is not bent.

The first housing section 60 and the second housing section 70 fit the convex stepped portion 62 to the concave stepped portion 72 with the frame section 12 of the filtration filter 10 interposed therebetween. Accordingly, the frame section 12 of the filtration filter 10 is sandwiched by the convex stepped portion 62 and the concave stepped portion 72 in the thickness direction (Z direction).

By fitting the convex stepped portion 62 to the concave stepped portion 72, the convex surface of the convex stepped portion 62 in contact with the first surface PS3 of the frame section 12 generates force toward the second housing section 70 from the first housing section 60 in the thickness direction (Z direction) to the first surface PS3 of the frame section 12. On the other hand, the concave surface of the concave stepped portion 72 in contact with the second surface PS4 of the frame section 12 generates force from the second housing section 70 toward the first housing section 60 in the thickness direction to the second surface PS4 of the frame section 12.

As described above, the first housing section 60 and the second housing section 70 fit the convex stepped portion 62 to the concave stepped portion 72, so that the frame section 12 of the filtration filter 10 is sandwiched by the convex surface of the convex stepped portion 62 and the concave surface of the concave stepped portion 72 in the thickness direction (Z direction).

In Embodiment 2, each of the convex surface of the convex stepped portion 62 and the first surface PS3 of the frame section 12 has a flat shape. Further, each of the concave surface of the concave stepped portion 72 and the second surface PS4 of the frame section 12 has a flat shape. Therefore, the convex stepped portion 62 and the concave stepped portion 72 can hold the frame section 12 in the thickness direction without bending the frame section 12. Thereby, the filtration filter 10 can be held in the flow path 51 of the housing 52 in a state where force pulling the filtration filter 10 outward in the radial direction is suppressed.

With such a holding structure, even when a force is applied to the filtration filter 10 in the thickness direction (Z direction), the durability of the filtration filter 10 can be improved.

For example, when a load is applied to the filter section 11 of the filtration filter 10, the filtration filter 10 can be deflected in the thickness direction. Thereby, the force applied to the filtration filter 10 can be released and the filtration filter 10 can be suppressed from being damaged. That is, durability of the filtration filter 10 can be improved.

Figure 18:
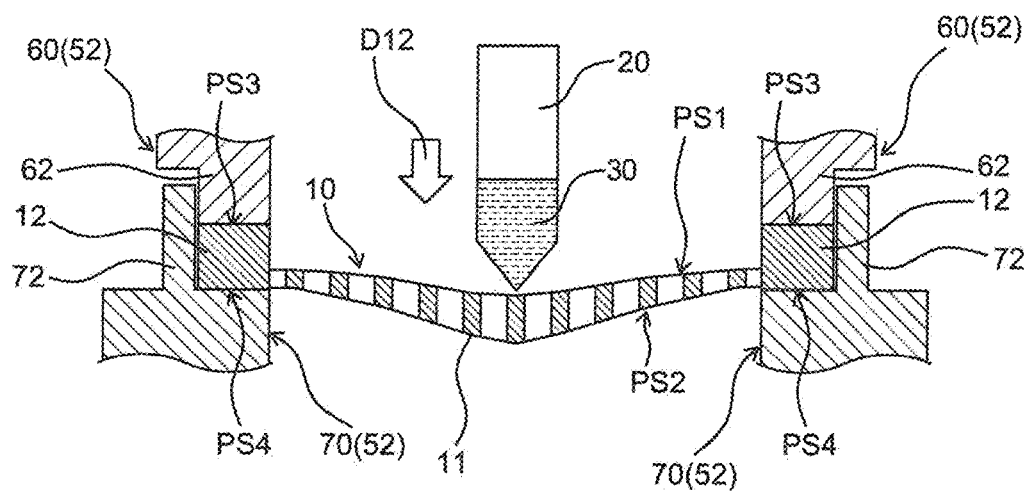
FIG. 18 is a diagram illustrating an example of filtration of the filtration device of Embodiment 2 according to the present invention.

FIG. 18 illustrates an example of filtration using the filtration device 50. In the example illustrated in FIG. 18, a tip of the pipette 20 containing the liquid 30 containing the objects to be filtered is pressed against the first main surface PS1 of the filter section 11 of the filtration filter 10 to perform filtration. Note that the tip of the pipette 20 is in contact with a portion where the film thickness is the largest in the filter section 11.

As illustrated in FIG. 18, when the tip of the pipette 20 is pressed against the first main surface PS1 of the filter section 11, a load is applied to the filter section 11 in a direction D12 from the first main surface PS1 toward the second main surface PS2.

As described above, in the filtration filter 10, the frame section 12 is held in the thickness direction (Z direction) by the first housing section 60 and the second housing section 70, thereby holding the filtration filter 10. Therefore, the filtration filter 10 is held in a state where the force pulling the filtration filter 10 outward in the radial direction is suppressed.

Thus, when the tip of the pipette 20 is pressed against the first main surface PS1 of the filter section 11, the filter section 11 can be deflected in the direction D12. Thereby, the force applied to the filter section 11 can be released and the filtration filter 10 can be suppressed from being damaged.

Note that, when the first housing section 60 and the second housing section 70 hold the frame section 12 in a state where the frame section 12 is bent, pulling force is generated outward of the filtration filter 10 in the radial direction (X, Y direction) in the bent portion of the frame section 12. Therefore, the filtration filter 10 is held in the flow path 51 of the housing 52 in a state of being pulled outward in the radial direction. In this case, when a load is applied to the filter section 11, it becomes difficult to deflect the filtration filter 10 in the thickness direction (Z direction).

As described above, in the holding structure of the filtration filter 10 in the filtration device 50, the first housing section 60 and the second housing section 70 sandwich the frame section 12 of the filtration filter 10 in the thickness direction (Z direction) and hold the frame section 12 without bending.

[Effect]

According to the filtration device 50 according to Embodiment 2, the following effects can be obtained.

The filtration device 50 holds the filtration filter 10 in the flow path 51 inside the housing 52 by sandwiching the frame section 12 of the filtration filter 10 in the thickness direction (Z direction). Further, the frame section 12 is held by the first housing section 60 and the second housing section 70 in a state of continuously extending in the direction (X, Y direction) from the filter section 11 toward the frame section 12.

With such a configuration, the filtration filter 10 can be held in the flow path 51 inside the housing 52 in a state where the force pulling the filtration filter 10 outward in the radial direction is suppressed. Therefore, the durability of the filtration device 50 can be improved. In particular, the durability of the filter section 11 of the filtration filter 10 against the force applied in the thickness direction can be improved.

For example, in filtration using the pipette 20, when the tip of the pipette 20 is pressed against the filtration filter 10, the filtration filter 10 can be deflect in the pressed direction D12. Thereby, the force applied to the filtration filter 10 can be released, and the filtration filter 10 can be suppressed from being damaged.

In Embodiment 2, the example in which the first housing section 60 and the second housing section 70 have a cylindrical shape has been described, but the present invention is not limited thereto. The first housing section 60 and the second housing section 70 may have any shape as long as they hold the filtration filter 10, and may have, for example, a rectangular shape, an elliptical shape, or the like.

In Embodiment 2, the example has been described in which the first housing section 60 and the second housing section 70 have the convex stepped portion 62 and the concave stepped portion 72, respectively, but the present invention is not limited thereto. For example, the first housing section 60 and the second housing section 70 do not need to have the convex stepped portion 62 and the concave stepped portion 72. The first housing section 60 may have a concave stepped portion, and the second housing section 70 may have a convex stepped portion. Alternatively, the first housing section 60 and the second housing section 70 may have any shapes other than the convex stepped portion 62 and the concave stepped portion 72 as long as they can be fitted to each other.

In Embodiment 2, the example has been described in which the convex surface of the convex stepped portion 62 and the concave surface of the concave stepped portion 72 each has a flat shape, but the present invention is not limited thereto. The convex surface of the convex stepped portion 62 and the concave surface of the concave stepped portion 72 may have any shapes as long as they can sandwich the frame section 12 of the filtration filter 10 in the thickness direction (Z direction).

In Embodiment 2, the example has been described in which the first housing section 60 and the second housing section have the first flange portion 63 and the second flange portion 73, respectively, but the present invention is not limited thereto. The first housing section 60 and the second housing section may not have the first flange portion 63 and the second flange portion 73.

In Embodiment 2, the example has been described in which the first flange portion 63 and the second flange portion 73 have the first groove 63a and the second groove 73a, respectively, but the present invention is not limited thereto. The first flange portion 63 and the second flange portion 73 may not have the first groove 63a and the second groove 73a.

Figure 19:
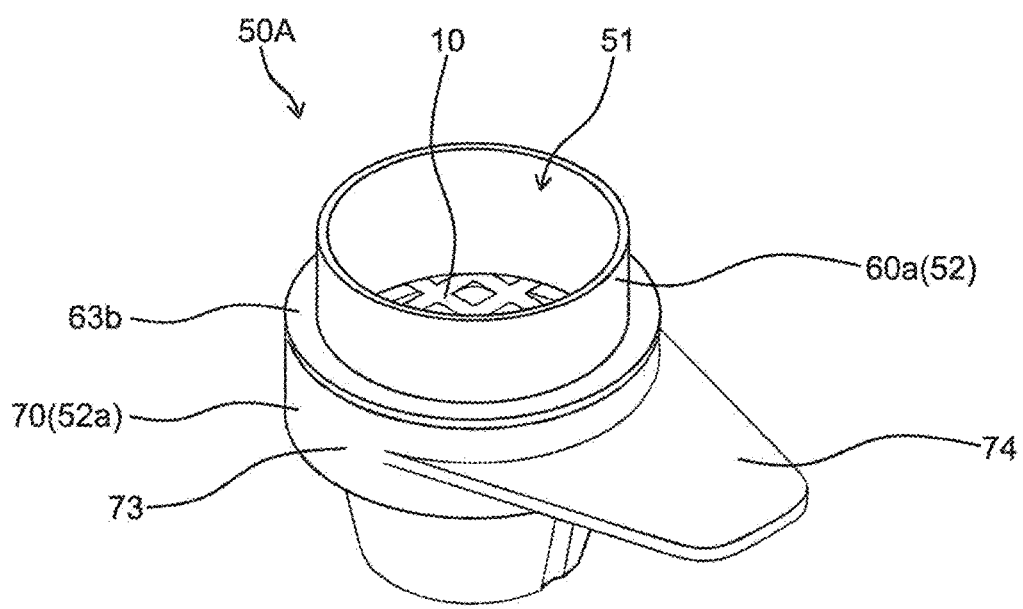
FIG. 19 is a schematic perspective view of a filtration device of a modification of Embodiment 2 according to the present invention.
Figure 20:
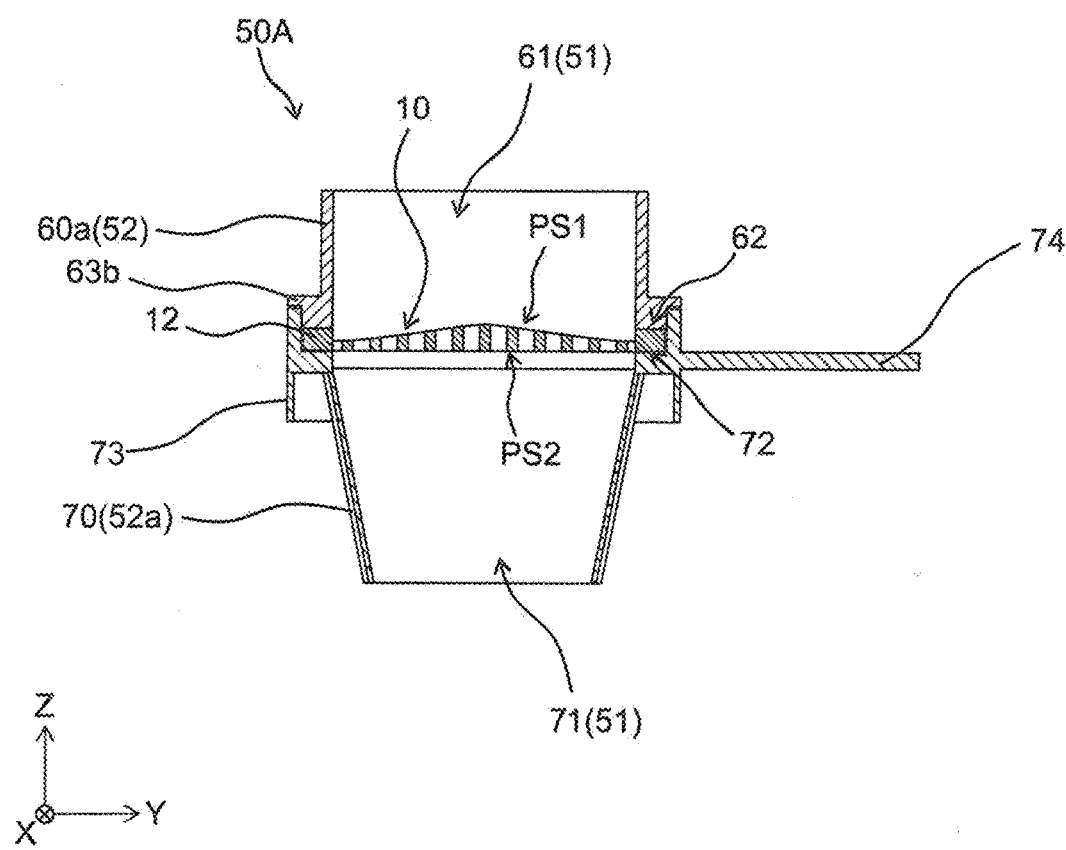
FIG. 20 is a schematic sectional view of the filtration device of the modification of Embodiment 2 according to the present invention.

FIG. 19 is a schematic perspective view of a filtration device 50A of a modification of Embodiment 2 according to the present invention. FIG. 20 is a schematic sectional view of the filtration device 50A of the modification of Embodiment 2 according to the present invention. As illustrated in FIGS. 19 and 20, in the filtration device 50A, a first flange portion 63b of a first housing section 60a does not have a groove that engages with the opening end portion of the container. Further, the diameter of the first housing section 60a is formed to be constant from the end portion on the side where the second housing section 70 is fitted to the end portion on the opposite side.

With such a configuration, the flow path inlet of the first flow path 61 of the first housing section 60a can be widened. For this reason, the liquid 30 containing the objects to be filtered can easily flow through the first flow path 61 of the first housing section 60a. Also, even in a case of filtration using the pipette 20, the tip of the pipette 20 can be more easily pressed against a portion where the thickness of the filter section 11 is thick. Thereby, the operability of the filtration device 50A is improved.

Although the present invention has been fully described in connection with preferred embodiments with reference to the accompanying drawings, various variations and modifications will be apparent to those skilled in the art. Such variations and modifications are to be understood as included within the scope of the present invention as defined by the appended claims.

INDUSTRIAL APPLICABILITY

Since the filter of the present invention can improve a recovery rate of nucleated cells, it is useful for isolating nucleated cells from a cell suspension.

REFERENCE SIGNS LIST 10, 10A, 10B FILTRATION FILTER
11, 11a, 11b FILTER SECTION
12 FRAME SECTION
13 THROUGH-HOLE
14 FILTER BASE SECTION
20 PIPETTE
21 SUBSTRATE
22 COPPER THIN FILM
23 RESIST FILM
24 GROOVE PORTION
30 LIQUID
40, 40a, 40b, 40c, 40d, 40e, 40f TWO-DIMENSIONAL MODEL
41 END PORTION
42 END PORTION
43 CENTRAL PORTION
50, 50A FILTRATION DEVICE
51 FLOW PATH
52 HOUSING
60 FIRST HOUSING SECTION
61 FIRST FLOW PATH
62 CONVEX STEPPED PORTION
63, 63b FIRST FLANGE PORTION
63a FIRST GROOVE
70 SECOND HOUSING SECTION
71 SECOND FLOW PATH
72 CONCAVE STEPPED PORTION
73 SECOND FLANGE PORTION
73a SECOND GROOVE
74 HANDLE
PS1 FIRST MAIN SURFACE
PS2 SECOND MAIN SURFACE
PS3 FIRST SURFACE
PS4 SECOND SURFACE
D1, D2, D3 RADIUS
CL1 VIRTUAL STRAIGHT LINE
P1 CENTER
P2, P3 INTERSECTION POINT
R11, R12, R13 REGION
D11, D12 DIRECTION

The invention claimed is:

1. A filtration filter comprising:
a filter section having a plurality of through-holes passing through and directly connecting a first main surface and a second main surface opposite the first main surface of the filter section, the filter section being constructed such that objects to be filtered contained in a liquid are captured; and
a frame section surrounding an outer periphery of the filter section,
wherein the second main surface of the filter section has a flat shape, and
wherein a thickness of the filter section decreases in an order from a central region of the filter section to an intermediate region of the filter section and then followed by a rim side region of the filter section, the rim side region being closest to the frame section relative to the central region and the intermediate region.

2. The filtration filter according to claim 1, wherein the first filter a thickness at the central region of the filter section is larger than a thickness of the frame section.

3. The filtration filter according to claim 2, wherein a thickness at the rim side region is larger than the thickness of the frame section.

4. The filtration filter according to claim 1, wherein a thickness at the rim side region is larger than a thickness of the frame section.

5. The filtration filter according to claim 1,
wherein the filter section has a substantially circular shape, and
the frame section has a ring shape surrounding the outer periphery of the filter section.

6. A filtration device comprising: the filtration filter according to claim 1; and
a housing defining a flow path for the liquid and holding the filtration filter in the flow path, the housing including:
a first housing section defining a first flow path facing the first main surface of the filter section of the filtration filter; and
a second housing section defining a second flow path facing the second main surface of the filter section of the filtration filter, and
the first housing section is configured to fit with the second housing section with the frame section of the filtration filter interposed between the first housing section and the second housing section such that the frame section is sandwiched in a thickness direction and held by the first housing section and the second housing section in a state where the filtration filter continuously extends in a direction from the filter section toward the frame section.

7. The filtration device according to claim 6,
wherein the first housing section has a protruding portion that protrudes in a direction from the first housing section toward the second housing section on a side thereof fitted to the second housing section,
the second housing section has a recessed portion that is recessed in the direction from the first housing section toward the second housing section on a side thereof fitted to the first housing section, and
the protruding portion fits to the recessed portion such that the frame section of the filtration filter is sandwiched therebetween in the thickness direction.

8. The filtration device of claim 6, further comprising a flange portion that extends outward from a sidewall of the second housing section.

9. The filtration device of claim 6, further comprising a flange portion that extends outward from a sidewall of the first housing section.

10. The filtration device according to claim 6, wherein the second housing section has a handle.

11. A filtration filter comprising:
a filter section having a plurality of through-holes passing through and directly connecting a first main surface and a second main surface opposite the first main surface of the filter section, the filter section being constructed such that objects to be filtered contained in a liquid are captured; and
a frame section surrounding an outer periphery of the filter section,
wherein the filter section has a convex shape protruding out from a side of the first main surface,
wherein a thickness of the filter section decreases in an order from a central region of the filter section to an intermediate region of the filter section and then followed by a rim side region of the filter section, the rim side region being closest to the frame section relative to the central region and the intermediate region, and
wherein a first depth of a first through-hole of the plurality of through-holes in the central region of the filter section is larger than a second depth of a second through-hole of the plurality of through-holes in the rim side region of the filter section.

12. The filtration filter according to claim 11,
wherein the filter section has a substantially circular shape, and
the frame section has a ring shape surrounding the outer periphery of the filter section.

13. A filtration device comprising:
the filtration filter according to claim 11; and
a housing defining a flow path for the liquid and holding the filtration filter in the flow path, the housing including:
 a first housing section defining a first flow path facing the first main surface of the filter section of the filtration filter; and
 a second housing section defining a second flow path facing the second main surface of the filter section of the filtration filter, and
the first housing section is configured to fit with the second housing section with the frame section of the filtration filter interposed between the first housing section and the second housing section such that the frame section is sandwiched in a thickness direction and held by the first housing section and the second housing section in a state where the filtration filter continuously extends in a direction from the filter section toward the frame section.

14. The filtration device according to claim 13,
wherein the first housing section has a protruding portion that protrudes in a direction from the first housing section toward the second housing section on a side thereof fitted to the second housing section,
the second housing section has a recessed portion that is recessed in the direction from the first housing section toward the second housing section on a side thereof fitted to the first housing section, and
the protruding portion fits to the recessed portion such that the frame section of the filtration filter is sandwiched therebetween in the thickness direction.

15. The filtration device of claim 13, further comprising a flange portion that extends outward from a sidewall of the second housing section.

16. The filtration device of claim 13, further comprising a flange portion that extends outward from a sidewall of the first housing section.

17. The filtration device according to claim 13, wherein the second housing section has a handle.

18. The filtration filter according to claim 1, wherein the thickness of the filter section decreases continuously in the order from the central region of the filter section to the intermediate region of the filter section and then followed by the rim side region of the filter section.

19. The filtration device according to claim 11, wherein the thickness of the filter section decreases continuously in the order from the central region of the filter section to the intermediate region of the filter section and then followed by the rim side region of the filter section.

* * * * *